(12) United States Patent
Lerzer et al.

(10) Patent No.: US 8,670,758 B2
(45) Date of Patent: Mar. 11, 2014

(54) TECHNIQUE FOR PLATFORM-TO-PLATFORM COMMUNICATION

(75) Inventors: Jürgen Lerzer, Neumarkt/OPf (DE); Bernd Moeller, Henfenfeld (DE); Seyed-Hami Nourbakhsh, Nuremberg (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 169 days.

(21) Appl. No.: 12/744,133

(22) PCT Filed: Nov. 17, 2008

(86) PCT No.: PCT/EP2008/065667
§ 371 (c)(1),
(2), (4) Date: Jul. 26, 2010

(87) PCT Pub. No.: WO2009/065803
PCT Pub. Date: May 28, 2009

(65) Prior Publication Data
US 2010/0291920 A1    Nov. 18, 2010

Related U.S. Application Data

(60) Provisional application No. 60/990,616, filed on Nov. 28, 2007.

(30) Foreign Application Priority Data

Nov. 21, 2007    (EP) .................................... 07022590

(51) Int. Cl.
*H04W 4/00* (2009.01)
(52) U.S. Cl.
USPC .................. 455/426.1; 455/552.1; 455/422.1; 370/328; 370/338
(58) Field of Classification Search
USPC ............ 455/552.1, 433, 428, 560, 41.2, 417, 455/415, 445, 461, 414, 432.3, 462, 465, 455/414.1, 424, 416, 435.1–444, 564, 562, 455/432.1; 379/201.02, 207.13, 207.02, 379/120, 121.01, 111, 113, 35, 221, 114, 379/211.01–211.04; 370/331, 392, 230.1, 370/328, 329, 330, 336, 337, 338, 341, 347, 370/442, 395.52, 352
See application file for complete search history.

(56) References Cited

U.S. PATENT DOCUMENTS

| | | | |
|---|---|---|---|
| 5,438,684 | A | 8/1995 | Schwent et al. |
| 5,878,343 | A | 3/1999 | Robert et al. |

(Continued)

FOREIGN PATENT DOCUMENTS

| | | | |
|---|---|---|---|
| EP | 1 467 582 A | 10/2004 | |
| EP | 1 467 584 A | 10/2004 | |

(Continued)

OTHER PUBLICATIONS

Tanenbaum: "Computer Networks—Remote Procedure Call". Prentice Hall PTR, XP055061545, pp. 526-529. Jan. 1, 2003.

(Continued)

*Primary Examiner* — Chuong A Ngo

(57) ABSTRACT

A technique for inter-platform communication between functional components located on different network access platforms will be described. A method aspect of this technique comprises the step of providing a first network access platform comprising a first functional component adapted to provide and/or request a platform-based function to and/or from a second functional component located on a second network access platform. On the first network access platform an inter-platform communication application is installed that is adapted to control signalling between the first functional component and the second functional component. The inter-platform communication application is enabled to contact a first middleware function provided for accessing the second functional component. Then, a communication path is established between the first functional component and the second functional via the inter-platform communication application and the first middleware function.

27 Claims, 14 Drawing Sheets

(56) References Cited

U.S. PATENT DOCUMENTS

| | | |
|---|---|---|
| 2003/0003951 A1 | 1/2003 | Leprieur et al. |
| 2005/0073977 A1 | 4/2005 | Vanghi et al. |
| 2007/0173283 A1* | 7/2007 | Livet et al. ............... 455/552.1 |
| 2007/0183461 A1 | 8/2007 | Eyal et al. |
| 2008/0039080 A1* | 2/2008 | Bertagnole et al. .......... 455/433 |

FOREIGN PATENT DOCUMENTS

| | | |
|---|---|---|
| GB | 2 410 861 A | 8/2005 |
| RU | 2005 114 918 A | 5/2005 |
| WO | WO 2006/073212 A1 | 7/2006 |
| WO | WO 2007/112583 A1 | 10/2007 |
| WO | WO 2008/013878 A | 1/2008 |

OTHER PUBLICATIONS

Jindal et al: "Local Remote Procedure Cali Extensions for Distributed Computer Environment", IP.com Inc., West Henrietia, NY, US, Dec. 1, 1994. XP013102465, ISSN: 1533-0001.

Carlton, et al: "Media Independent Handover Functions and Services Specification". XP002426102. Jul. 11, 2005. http//www.ieee802.org/21/doctree/2005_Meeting_Docs/2005-07_meeting_docs/.

* cited by examiner

TECHNIQUE FOR PLATFORM-TO-PLATFORM COMMUNICATION

This application claims the benefit of U.S. Provisional Application No. 60/990,616, filed Nov. 28, 2007, the disclosure of which is fully incorporated herein by reference.

TECHNICAL FIELD

The present invention generally relates to network access technologies (NATs). Specifically, the invention relates to a technique that permits a functional component located on a first network access platform to communicate with a functional component located on a second network access platform.

BACKGROUND

Mobile telephones have traditionally been voice-centric devices with proprietary operating systems handling all communication tasks. The Application Programming Interfaces (APIs) in these devices were not made available to third-party developers. As a consequence, end users were dependent on the device manufacturers for applications.

Today, the mobile communications industry is increasingly becoming aware of the importance and benefits of open application environments for mobile devices. Basically, an open application environment permits the installation of third party applications on the mobile device during device manufacture or later on by a user operating the device. Such third party applications include games, software upgrades, etc.

A. Ghosh et al., "Open application environments in mobile devices: Focus on JME and Ericsson Mobile Platforms", Ericsson Review No. 2, Vol. 82, 2005, pages 82 to 91 (ISSN: 0014-0171) describe an exemplary open application environment for mobile devices. The open application environment is based on a mobile platform with a digital baseband processor supporting wireless NATs, so-called radio access technologies (RATs), such as General Packet Radio Service (GPRS), Enhanced Data for GSM Evolution (EDGE) or Wideband Code-Division Multiple Access (WCDMA). A mobile platform is an environment that includes all the necessary integrated circuits and software needed to provide wireless network access services and communication services (e.g. for voice, data or multimedia applications), as well as interfaces to make these services available to applications residing on the mobile platform.

In the open application environment described by A. Ghosh et al., dedicated middleware services are provided to allow an application-based control of platform-internal functionalities such as the resolution and the encoding of data streams. These middleware services include an API (the so-called Open Platform API, or OPA) that is structured into various well-defined categories. This structure of the OPA makes it easy for an application programmer to locate and address platform-specific functionalities.

Conventionally, mobile platforms often included proprietary Operating Systems (OS). Now, with the advent of the open application environment, an application platform with a third-party application processor will be added to the mobile device when it is desired to run an open OS such as Symbian. The application platform will be co-located with the mobile platform in the mobile device and handle all applications including, for example, multimedia applications. The mobile platform, on the other hand, will be in charge of a reduced set of functionalities (including all mobile communications tasks such as wireless network access) and mainly act as a network access platform. Between the application platform and the mobile platform an interface mechanism provides the applications on the application platform with access (via OPA) to platform-internal functionalities of the mobile platform as if the applications resided directly on the mobile platform.

In some cases it may be necessary or desirable to equip a mobile device with more than one NAT. In this regard, WO-A-00/22857 teaches a modular approach in which different network access platforms in the form of so-called network access modules (such as a Local Area Network (LAN) module and a Global System for Mobile communications (GSM) module) are interconnected via a communication bus according to the Universal Serial Bus (USB) standard. Other modules connected to the communication bus such as a Closed-Circuit Television (CCTV) module may then selectively transmit signals via the LAN module on the one hand or via the GSM module on the other.

It has been found that it would be advantageous to let network access platforms communicate directly with each other. Such a direct communication is desirable to implement low-level control mechanisms for example in context with handover signalling between the network access platforms. Moreover, it may in certain cases be desirable to make such inter-platform communication concepts compatible with open application environments.

SUMMARY

Accordingly, there is a need for an efficient technique that allows for a low-level communication between two or more network access platforms.

According to a first aspect, this need is satisfied by a method of enabling a communication between functional components located on different network access platforms, wherein the method comprises the steps of providing a first network access platform comprising a first functional component adapted to provide and/or request a platform-based function to and/or from a second functional component located on a second network access platform; installing on the first network access platform an inter-platform communication application adapted to control signalling between the first functional component and the second functional component; enabling the inter-platform communication application to contact a first middleware function provided for accessing the second functional component; and establishing a communication path between the first functional component and the second functional component via the inter-platform communication application and the first middleware function.

According to a first variant, the first middleware function is installed on the first network access platform. According to a second variant, the first middleware function is accessible via the second network access platform. To this end, the first middleware function may be installed on (e.g. physically within or logically on top of) the second network access platform. In case the middleware function is installed on the second network access platform, any signalling directed to the first middleware function is routed through the second network access platform.

In case the first middleware function is accessible via the second network access platform, or in other cases that require an inter-platform communication, one or more inter-platform communication interfaces may be provided. In this regard, a first interface may be provided on the first network access platform, and the step of enabling the inter-platform communication application to contact the first middleware function may comprise coupling the first interface of the first network access platform to a second interface of the second network access platform.

Both the first network access platform and the second network access platform may be provided with one or more control and/or data interfaces. In one implementation, each platform includes at least one control interface and at least one data interface, and the control and data interfaces of one platform are coupled to the control and data interfaces, respectively, of the other platform.

The control interfaces may differ from the data interfaces as regards the supported data rates. Data interfaces such as interfaces in accordance with the USB standard will typically support higher data rates than control interfaces according, for example, to the Universal Asynchronous Receiver/Transmitter (UART) standard or the General Purpose Input/Output (GPIO) standard.

The method may further comprise the step of importing, by the first network access platform, the first middleware function from the second network access platform. According to one importing variant, the program code of the first middleware function is transferred from the second network access platform to the first network access platform over one or more inter-platform communication interfaces. According to a further variant, the importing step comprises visualising to the first network access platform the first middleware function, which may in fact remain installed on the second network access platform.

The inter-platform communication path between the first functional component and the second functional component may further include a capsulation mechanism adapted to encapsulate and decapsulate signalling transferred between first network access platform and the second network access platform. The encapsulation and decapsulation process may relate to various signalling contents such as identifiers of the calling and/or the called functional component, input or output parameters of a function provided by the called functional component, and so on. During the encapsulation process, signalling contents may be packed into one or more physical data units (PDUs), and the decapsulation process may comprise a corresponding unpacking of the PDUs. In one implementation, the encapsulation and decapsulation processes are performed transparently for the calling and the called functional component.

The capsulation mechanism may stretch across the first network access platform and the second network access platform and may thus effectively constitute an inter-platform communication mechanism. In particular in cases in which the inter-platform communication application is installed on the first network access platform and the first middleware function is accessible via the second network access platform, the capsulation mechanism may be inserted into the communication path logically between the inter-platform communication application and the first middleware function. The capsulation mechanism may thus be a vehicle for visualising the first middleware function to the inter-platform communication application installed on the first network access platform (in accordance with the second importing variant discussed above).

In some cases a calling functional component may need not be aware of the fact that the called functional component is located on another network access platform. In such a case it may be advantageous to insert one or more virtual functional components into the communication path, and each virtual functional component may simulate to a calling functional component an existence of the called functional component on the local network access platform of the calling functional component. Virtual functional component located on the second network access platform may simulate to the second functional component (which is also located on the second network access platform) an existence of the first functional component (which is actually located on the first network access platform) on the second network access platform, and vice versa.

The one or more virtual functional components may be provided to perform translation tasks with respect to signalling occurring on the communication part. Each virtual functional component may, for example, translate a request received from a calling functional component into a requesting message that can be read by the inter-platform communication application, and vice versa. In this regard, the virtual functional components can be interpreted as translators between calling functional components and the inter-platform communication application, which may act as a kind of proxy towards the called functional components.

In some cases it will be desirable to notify the inter-platform communication application of signalling events generated by any functional component or routed through (and possibly translated by) any virtual functional component. To this end, the inter-platform communication application may notify one or more of the functional components and virtual functional components of the fact that any (or specific) signalling events within a platform are to be signalled to the inter-platform communication application. Such a notification can be regarded as subscribing, by the inter-platform communication application, to signalling events of one or more functional components and/or virtual functional components.

The inter-platform communication application may itself perform translation tasks with respect to signalling occurring on the communication path. Such translation tasks may comprise translating signalling events from a calling functional component or from a virtual functional component (that may not be readable by a called functional component) into a format readable by the called functional component.

The communication path between the first functional component and the second functional component may be used for various signalling purposes. According to a first variant, the signalling relates to an internal handover between NATs deployed on different network access platforms. The inter-platform signalling may also occur in context with an access to a smart card or a memory card such as a Universal Integrated Circuit Card (UICC) in general and a Subscribal Identity Module (SIM) card in particular. When the two platforms are configured to perform modem tasks, the signalling transferred via the established communication path between the different functional components may include one or more modem commands such as commands belonging to the Hayes command set (also called AT commands). Of course, the communication path may also be used to transfer any other system control signalling.

In one scenario, a second middleware function adapted to provide access to the first functional component located on the first network access platform is provided. The second middleware function may be arranged in the communication path logically between the inter-platform communication application and the first functional component. The second middleware function may thus be accessible via the first network access platform. If the need arises, the second middleware function may alternatively be installed on the second network access platform.

At least one of the first middleware function and the second middleware function may comprise an API. The first middleware function may for example provide an API in relation to the second functional component, and the second middleware function may provide an API in relation to the first functional component. Especially in the context of an open application environment, each API may be configured as an OPA. In such a case, at least one of the first functional component and the second functional component may additionally be accessible to applications of the open application environment. These applications may reside on one or all of the network access platforms, or on a separate application platform with a dedicated application processor.

In general, the NATs supported by the network access platforms may be line-based NATs or wireless NATs. In a preferred variant, the first network access platform comprises a first baseband processor supporting at least one first radio access technology (RAT), and the second network access platform comprises a second baseband processor supporting a second RAT. The second RAT may be different from the at least one first RAT. The first network access platform and the second network access platform may be co-located within a single device. Such a device may further comprise one or more application processors (located, for example, on one or more application platforms) coupled to at least one of the network access platforms.

According to another aspect, a further method of enabling a communication between functional components located on different network access platforms is provided, wherein the method comprises the steps of providing a first network access platform comprising a first functional component adapted to provide and/or request a platform-based function to and/or from a second functional component located on a second network access platform; installing on the first network access platform a middleware function enabling (e.g. an inter-platform communication application) access to the first functional component; and establishing a communication path between the first functional component and the second functional component via the middleware function and the inter-platform communication application.

The techniques presented herein may be realised in the form of software, in the form of hardware or using a combined software/hardware approach. As regards a software aspect, a computer program product comprising program code portions for performing the steps presented herein when the computer program product is run on one or more computing devices is provided. The computer program product may be stored on a computer-readable recording medium such as a memory chip, a CD-ROM, a harddisk, and so on.

As for a hardware aspect, a platform system adapted to enable a communication between functional components located on different network access platforms is provided, wherein the system comprises a first network access platform comprising a first functional component adapted to provide and/or request a platform-based function to and/or from a second functional component located on a second network access platform; an inter-platform communication application installed on the first network access platform and adapted to control signalling between the first functional component and the second functional component; an interface adapted to enable the inter-platform communication application to contact a middleware function provided for accessing the second functional component; and a controller adapted to establish a communication path between the first functional component and the second functional component via the inter-platform communication application and the middleware function.

The platform system may be adapted to operate in accordance with the Universal Mobile Telecommunications System (UMTS) standard. Moreover, the interface may be configured as a USB and/or as a Universal Asynchronous Receiver/Transmitter (UART) interface.

According to another hardware aspect, a platform system adapted to enable a communication between functional components located on different network access platforms is provided, wherein the system comprises a first network access platform comprising a first functional component adapted to provide and/or request a platform-based function to and/or from a second functional component located on a second network access platform; a middleware function installed on the first network access platform and adapted to enable (e.g. an inter-platform communication application) access to the first functional component; and a controller adapted to establish a communication path between the first functional component and the second functional component via the middleware function and the inter-platform communication application. The platform system may be adapted to operate in accordance with the Long Term Evolution (LTE) standard.

The two platform systems discussed above may be included in a single device with a common controller or with separate controlling entities. The device may be configured as at least one of a network card, a portable terminal and a mobile telephone. The functional components may be realized as hardware or software modules providing Layer 1 (L1) RAT measurements, SIM access, handover signalling (e.g. between the internal NATs), modem command signalling (e.g. with one platform acting as modem for an application or functional component residing on the other platform), and general platform control functionalities.

BRIEF DESCRIPTION OF THE DRAWINGS

Further aspects and advantages of the technique presented herein will become apparent from the following description of preferred embodiments and the drawings, wherein.

DESCRIPTION OF PREFERRED EMBODIMENTS

Figure 1:
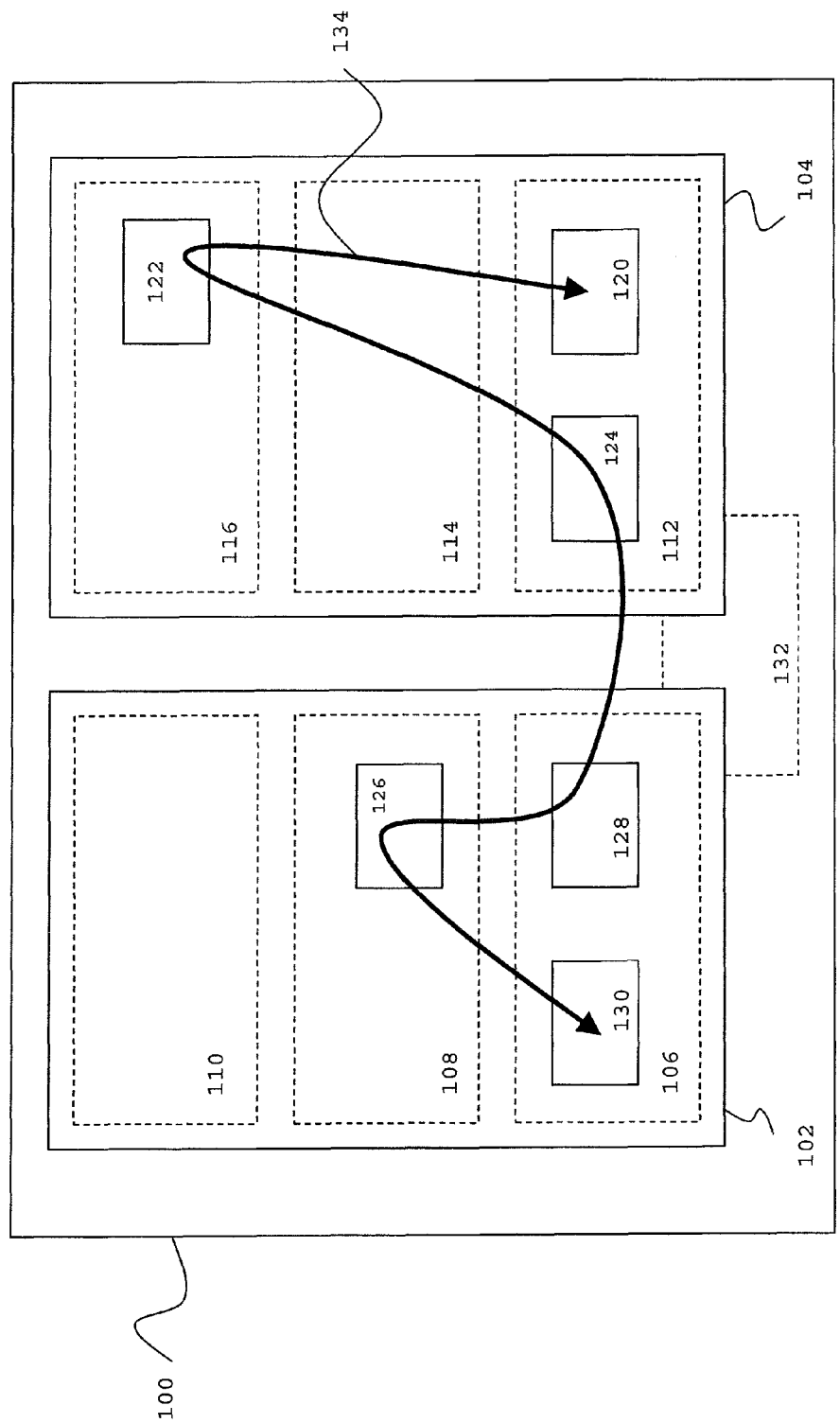
FIG. 1 shows a schematic diagram of a first device embodiment incorporating two platform system embodiments.

In the following description of preferred embodiments, for purposes of explanation and not limitation, specific details are set forth (such as particular interfaces, network access technologies and sequences of steps) in order to provide a thorough understanding of the present invention. It will be apparent to one skilled in the art that the present invention may be practiced in other embodiments that depart from these specific details. For example, while the embodiments will primarily be described in context with third and fourth generation mobile communications standards such as the UMTS and LTE standards, respectively, it will be evident that the present invention can also be practised in connection with a second generation mobile communications technology according, for example, to the GSM standard.

Moreover, those skilled in the art will appreciate that the services, functions and steps explained herein below may be implemented using software functioning in conjunction with a programmed micro processor, an Application Specific Integrated Circuit (ASIC), a Digital Signal Processor (DSP) or a general purpose computer. It will also be appreciated that while the following embodiments will primarily be described in context with methods and devices, the invention may also be embodied in a computer program product as well as in a system comprising a computer processor and a memory coupled to the processor, wherein the memory is encoded with one or more programs that may perform the services, functions and steps disclosed herein.

In the following, reference will be made to middleware functions in the form of interfaces (such as APIs and in particular OPAs). Such middleware functions generally do an abstraction of platform internal interfaces. This means that any components or interfaces above the middleware interfaces should not be effected by (i.e. should be independent from) changes of components and interfaces below the middleware interfaces. Some middleware interfaces might be transparent for some messages or communications.

An OPA, for example, may be built on an object-based paradigm in such a way that any developers do not need to be concerned with platform implementation details. As such, OPAs also reduce specific hardware and operating system dependencies for the application software. As initially mentioned, OPA services may be organized in categories and sub-categories in order to obtain a functional structure and partitioning of the OPA services. Each sub-category may contain a number of components, and these components may provide one or more interfaces in order to use the OPA services. The components typically define an object model for the functionality of this sub-category, and each interface of a component may consist of one or more methods.

The OPA paradigm may include synchronous and asynchronous services. While a synchronous service blocks any requesting client until the service is completed and the result is returned, an asynchronous service is a non-blocking service as the requesting client may continue any ongoing processes until the result (or event) becomes available. The asynchronous services may be divided into asynchronous request services and asynchronous subscription services. The OPA described herein may support two different modes for handling asynchronous result/event messages, namely a so-called full message mode and a callback mode. The full message mode is always taking control over the complete message loop, while the callback mode hides the message loop and provides a higher level of support, according to which messages are directly routed to functions.

FIG. 1 schematically shows an embodiment of a device 100 capable of establishing network access via more than one NAT. The device 100 may be configured as a network card, as a portable terminal such as a Personal Digital Assistant (PDA) or as a mobile telephone.

As shown in FIG. 1, the device 100 includes two embodiments of network access platform systems 102, 104 adapted to provide network access. It should be noted that the device 100 could comprise one or more further platform systems (not shown) hosting one or more further NATs and/or hosting one or more application processors. Each platform system 102, 104 may be realised in the form of a separate ASIC and may comprise a dedicated platform processor. It should be noted that since the device 100 comprises two separate network access platform systems 102, 104, certain hardware, for example power supply components and Radio Frequency (RF) components, may be shared by both platform systems 102, 104.

Each platform system 102, 104 is logically structured into three dedicated tiers. Specifically, each platform system 102, 104 comprises a network access platform tier (in the following also called "platform") 106, 112, a middleware tier (in the following also called "middleware") 108, 114 as well as an application tier (in the following also called "application") 110, 118. Each tier 106, 108, etc. may logically comprise one or more components that may be realised in the form of software, in the form of hardware or as a software/hardware combination. It should be noted that in some cases a tier may not comprise any component, and in such a situation the corresponding tier need not be realised at all. In the scenario shown in FIG. 1, this applies to the application 110 of platform system 102 as well as the middleware 114 of platform system 104.

Still referring to FIG. 1, the platform 112 of platform system 104 is configured as a network access platform comprising a functional component 120 that is adapted to provide and/or request a platform-based function to and/or from a remote functional component located on the network access platform 106 of platform system 102. Platform system 104 further comprises an inter-platform communication application 122 logically installed on (meaning "on top of" here) the network access platform 112 and adapted to control signalling between the functional component 120 and a remote functional component residing on platform system 102.

The platform 112 further includes an interface 124 adapted to enable the inter-platform communication application 122 to contact a remote middleware function 126. In the embodiment shown FIG. 1, the middleware function 126 is located on the middleware tier 108 of platform system 102. To allow the inter-platform communication application 112 to contact the middleware function 126, an inter-platform connection will be established via the interface 124 and a corresponding interface 128 belonging to the platform 106 of platform system 102.

The middleware function 126 is adapted to provide access to a functional component 130 co-located with the interface 128 on the platform 106. The middleware function 126 may generally be configured as an API, and in particular as an OPA, in relation to the functional component 130.

The platform system 104 also comprises a controller 132 adapted to establish a communication path 134 to transfer signalling between the functional component 120 residing on the platform 112 of platform system 104 on the one hand and the functional component 130 residing on the platform 106 of platform system 102 on the other hand. The communication path 134 stretches across the inter-platform communication application 122 and the middleware function 126.

As shown in FIG. 1, the communication path 134 starts within the platform tier 106 of platform system 102 and ends within the platform tier 112 of platform system 104. The communication path 134 thus allows for a low-level platform-to-platform communication between the functional component 120 and the functional component 130. In the embodiment of FIG. 1, the term "low-level" indicates that the functional components 120, 130 communicating with each other are located below the application tiers 110, 116 and the middleware tiers 108, 114. Platform-internal functionalities provided by one or both of the functional components 120, 130 may thus be shared across the two platform systems 102, 104.

As regards the embodiment illustrated in FIG. 1, it should be noted that the controller 132 may either be located on platform system 104 or on platform system 102. The controller 132 could also be a distributed component with some control functionalities provided by platform system 102 and other control functionalities provided by platform system 104. According to a still further variant, the controller 132 may at least partially be a component of the device 100 external to both platform system 102 and platform system 104.

Figure 2:
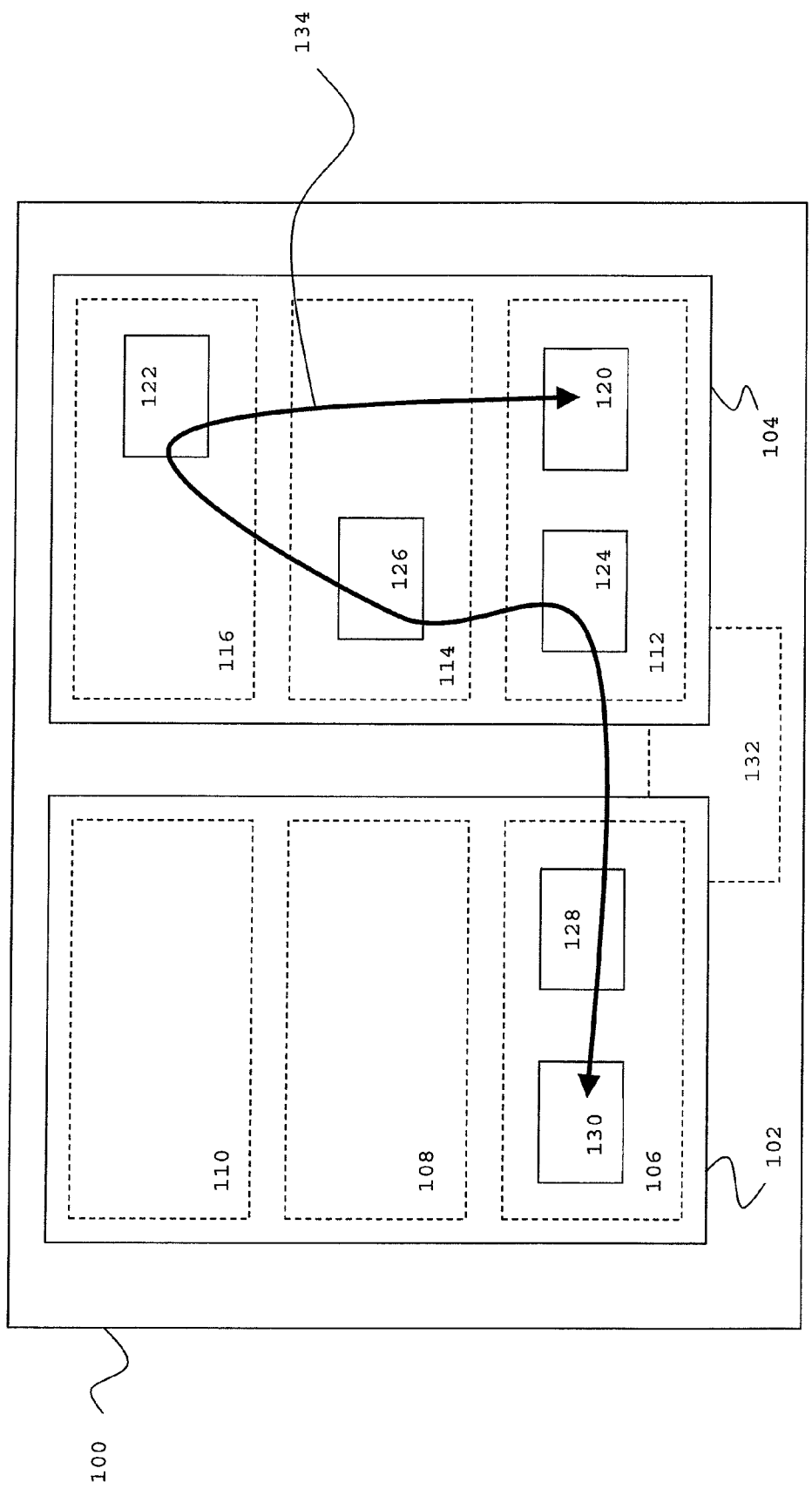
FIG. 2 is a schematic diagram of a second device embodiment incorporating two platform system embodiments.

FIG. 2 shows a further embodiment of a device 100 comprising two platform system embodiments 102, 104. The same reference numerals as in FIG. 1 are used to designate identical or similar components, and only the differences between the two embodiments of FIG. 1 and FIG. 2 will in the following be described in more detail.

As becomes apparent from FIG. 2, the most important difference to the embodiment shown in FIG. 2 relates to the middleware function 126, which is no longer located in the middleware tier 108 of platform system 102. Rather, the middleware function 126 has been moved to the middleware tier 114 of platform system 104. The middleware function 126 can now be contacted by the inter-platform communication application 122 via an intra-platform interface (not shown in FIG. 2) logically arranged between the inter-platform communication application 122 and the middleware function 126. Similar to the scenario shown in FIG. 1, the communication path 134 stretches from the functional component 120 via the inter-platform communication application 122 and the middleware function 126 to the functional component 130 located on the platform 106 of platform system 102.

According to a still further device embodiment not shown in the drawings, the inter-platform communication application 122 could be moved from the application tier 116 of platform system 104 to the application tier 110 of platform system 102. In such an embodiment, the middleware function 126 will be located within the middleware tier 108 of platform system 102 (as shown in FIG. 1). The communication path will stretch from the functional component 120 of platform system 104 via the inter-platform interfaces 124, 128 to the inter-platform communication application 122, and from there via the middleware function 126 to the functional component 130 of platform system 102.

Now, two method embodiments for enabling a communication between functional components located on different network access platforms will be described with reference to flowcharts 300, 400 of FIGS. 3 and 4. These method embodiments may be practised by the platform systems 102, 104 discussed above or by other platform systems having a suitable configuration.

Figure 3:
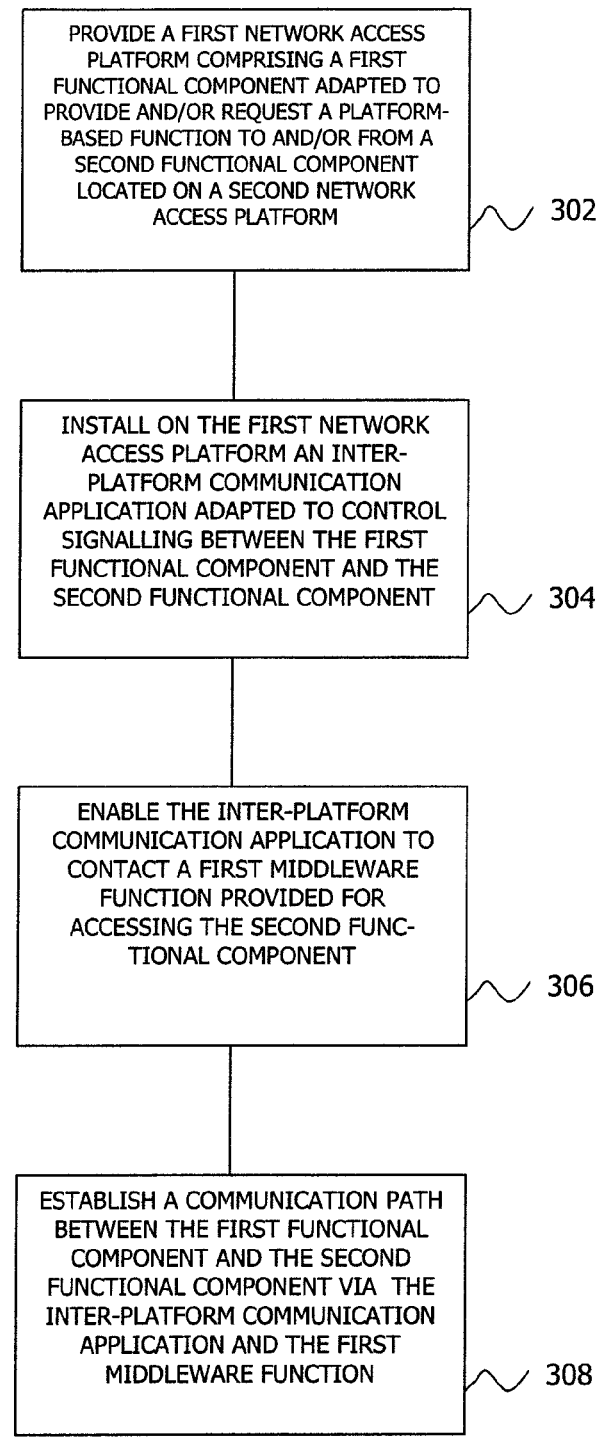
FIG. 3 is a flowchart illustrating a first method embodiment.

Referring now to the flowchart 300 of FIG. 3, a first method embodiment starts with providing a first network access platform comprising a first functional component adapted to provide and/or request a platform-based function to and/or from a second functional component located on a second network access platform (step 302).

In a next step 304, an inter-platform communication application is installed on the first network access platform. The inter-platform communication application is adapted to control signalling between the first functional component of the first network access platform and the second functional component of the second network access platform.

Then, in step 306, the inter-platform communication application is enabled to contact a middleware function provided for accessing the second functional component. To this end, an intra- or inter-platform interface may be provided.

In a further step 308, a communication path is established between the first functional component and the second functional component via the inter-platform communication application and the middleware function. This communication path allows for a low-level communication between the two functional components.

Figure 4:
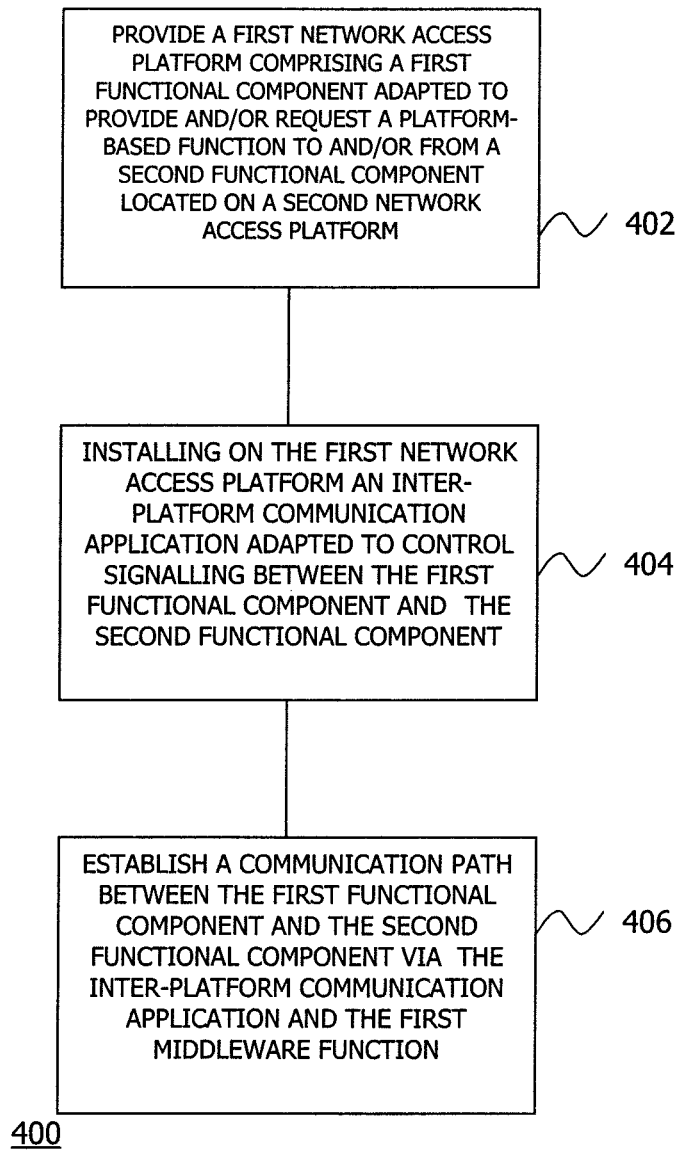
FIG. 4 is a flowchart illustrating a second method embodiment.

According to the further method embodiment illustrated in the flowchart 400 of FIG. 4, a first network access platform comprising a first functional component is provided in an initial step 402. The first functional component is adapted to provide and/or request a platform-based function to and/or from a second functional component located on a second network access platform.

In a further step 404, a middleware function is installed on the first network access platform. The middleware function enables an inter-platform communication application access to the first functional component.

Then, in step 406, a communication path is established between the first functional component of the first network access platform and the second functional component of the second network access platform. The communication path stretches across the middleware function and the inter-platform communication application.

In the following, the configuration of the system platforms as well as the process of establishing the communication path (and the signalling transferred over the established application path) will be described more in detail. First of all, the transition from a platform system having a stand-alone configuration to a platform system operable in a dual mode configuration together with another platform system co-located on the same device will be explained with reference to FIG. 5.

Figure 5A:
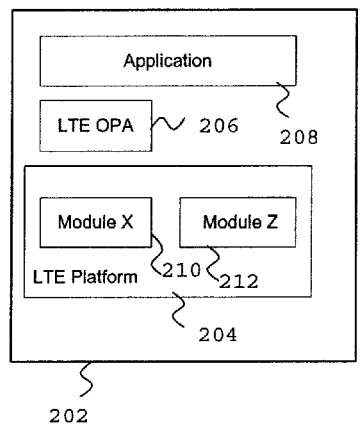
FIGS. 5a to 5c are schematic diagrams illustrating the transition from a single platform system solution to two dual platform system embodiments.

FIG. 5a illustrates a platform system 202 in a stand-alone configuration. Platform system 202 may be used in conventional devices with only a single network access platform. However, platform system 202 may also be used in a device in combination with one or more additional platform systems as will be discussed in context with FIGS. 5b and 5c later on. Platform system 202 shown in FIG. 5a may be derived from any of the platform systems 102, 104 shown in FIGS. 1 and 2.

As shown in FIG. 5a, platform system 202 comprises a network access platform 204 on a lowest tier, a middleware tier with a middleware function 206 as well as an application tier with an application 208.

In the embodiment shown in FIG. 5a, the network access platform 204 supports a RAT in accordance with the LTE standard. The LTE platform 204 comprises two functional components 210, 212 ("Module X" and "Module Z"). The functional components 210, 212 are adapted to provide and/ or request a platform-based function from each other. Such platform-based functions may include RAT-related functionalities such as Layer 1 (L1) measurements, handover signalling, SIM access or general system control functionalities on a platform level.

In the LTE embodiment shown in FIG. 5a, the middleware function 206 is configured as an LTE OPA. The LTE OPA realised by the middleware function 206 comprises the API functions that need to be provided to the application 208 for a control of the LTE platform 204 (including, but not restricted to, control of the functional components 210 and 212).

The platform 204 and the middleware function 206 may be integrated into a single ASIC as generally known from U.S. Pat. No. 7,149,510 B2 (see FIG. 2 thereof), herein incorporated by reference as far as a possible hardware and software realisation of platform system 202 and of one or more further platform systems as discussed herein is concerned. Specifically, such an ASIC may comprise an LTE baseband controller and a central processing unit (CPU) supporting an open or proprietary OS, as well as the required middleware software. The functional components 110 and 112 may be realised by the ASIC in the form of software, in the form of hardware or as a software/hardware combination.

In the embodiment shown in FIG. 5a, any communication between the functional components 210 and 212 constitutes intra-platform communication and can thus be easily realised using, for example, conventional programming techniques. However, this communication situation drastically changes in a dual-platform scenario when the two functional components 210 and 212 are no longer located on a single platform system.

Figure 5B:
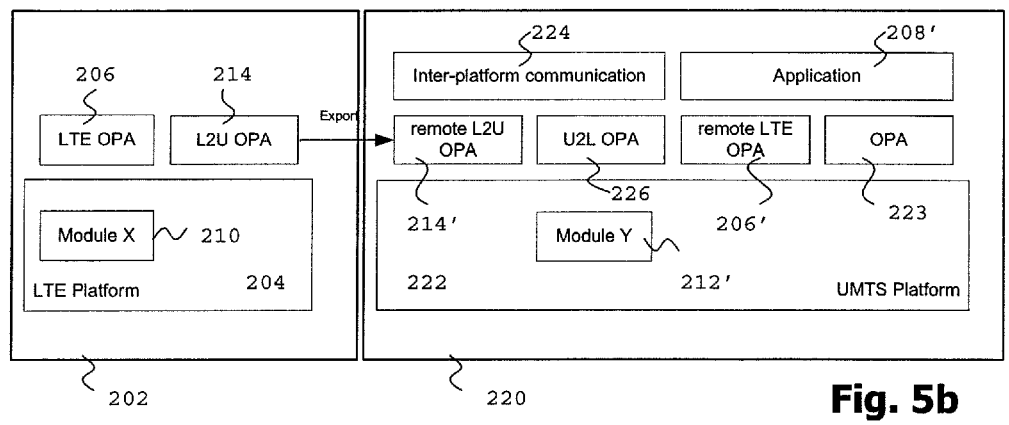

FIG. 5b shows such a dual-platform scenario in which the platform system 202 of FIG. 5a is co-located with a further similar platform system 220 in a single device. The further platform system 220 shown in FIG. 5b comprises a network access platform 222 providing support for a RAT according to the UMTS standard.

In the dual-platform embodiment shown in FIG. 5b, an application 208' of platform system 220 may need to access the functional component 210 ("Module X") located on the other platform system 202. The application 208' may belong to an open application environment. Moreover, the functional component 210 provided by the LTE platform 204 of platform system 202 may need to be accessed by (or may need to access) a functional component 212' ("Module Y") provided by the UMTS platform 222 of platform system 220. Such and similar communication scenarios require the implementation of an efficient inter-platform communication technique.

As discussed above in context with FIGS. 1 to 4, such an intra-platform communication technique may involve middleware functions and an inter-platform communication application. Returning to FIG. 5b, a middleware tier including a first middleware function 206' is provided to this end. The middleware function 206' permits the application 208' of platform system 220 a remote control of functional component 210 located on platform system 202. The middleware function 206' of platform system 220 has been derived from a corresponding middleware function 206 of platform system 202. As shown in FIG. 5b, platform system 220 comprises a further middleware function 223 which allows the application 208' a control of functionalities of the local UMTS platform 222 including control of the local functional component 212'.

As already mentioned, there may arise the need for a low-level inter-platform communication between the functional component 210 of platform system 202 and the functional component 212' of platform system 220. In such a case an intra-platform communication path between the functional component 212' and the functional component 210 may be established. The communication path (not shown in FIG. 5b) includes an inter-platform communication application 224 natively provided by platform system 220 as well as at least one imported 214' or native middleware function 226 on the middleware tier.

As regards the middleware tier, two cases may be differentiated in FIG. 5b. When the functional component 212' of platform system 220 calls a function provided by the functional component 210 of platform system 202, the communication path stretches from the functional component 212' via the middleware function 226, the inter-platform communication application 224 and the middleware function 214' to the functional component 210. When, on the other hand, the functional component 210 calls a function provided by the functional component 212', then the communication path stretches from the functional component 210 via the middleware function 214, the inter-platform communication application 224 and the middleware function 226 to the functional component 212'.

Basically, the middleware function 214' comprises an API (OPA) for accessing functions of the functional component 210, and the middleware function 226 comprises an API (OPA) for accessing functions of the functional component 212'. The middleware function 214' can be derived from middleware function 214 by import of same from platform system 202 in the form of program code, in the form of a remote visualisation as discussed below in context with FIG. 6 or in any other form.

It should be noted that for the sake of clarity, inter-platform interfaces for exporting and importing the middleware functions 206', 214' and for establishing the communication path are not shown in FIG. 5b. Such interfaces will be discussed below in context with FIGS. 8 to 10.

In the inter-platform communication scenarios described herein both middleware functions 214' and 226 may be included simultaneously in the communication path. The middleware function 214' (L2U OPA) includes all functions/services of the LTE platform system 202 for inter-platform communication and the middleware function 226 (U2L OPA) includes all functions/services of the UMTS platform system 220 for inter-platform communication. The purpose of the middleware functions 214', 226 will now be exemplarily be described with respect to Internal RAT (IRAT) measurements on the LTE platform 204 on the one hand and on the UMTS platform 222 on the other.

Starting with the LTE IRAT measurement scenario, it will be assumed that the functional component 210 of the LTE platform 204 is capable of providing IRAT measurements, while the functional component 212' on the UMTS platform 222 is capable of requesting such measurements. In this example, the middleware function 214' provides to the functional component 212' the service of (or an interface for) requesting LTE IRAT measurements from the functional component 210 and provides, after the measurements on the LTE RAT have been carried out, the corresponding results to the functional component 212'. The middleware function 226, on the other hand, provides to the functional component 212' the possibility of (or an interface for) subscribing for the event that the UMTS platform 222 wishes to trigger RAT measurements on the LTE RAT. Also, the middleware function 226 provides the service (or an interface) to the functional component 212' of forwarding the corresponding measurement results to the UMTS platform 222.

In the other case of UMTS IRAT measurements, it will be assumed that the functional component 212' on the UMTS platform 222 is capable of performing such measurements, whereas the functional component 210 on the LTE platform 204 is capable of requesting such measurements. In such a case the middleware function 226 provides to the functional component 210 the service of requesting IRAT measurements on the UMTS RAT and provides, after the measurements on the UMTS RAT have been completed by the functional component 212', the corresponding results to the functional component 210. The middleware function 214' provides to the functional component 210 the possibility of subscribing for the event that the LTE platform 204 (the functional component 210) wants to trigger IRAT measurements on the UMTS RAT. Additionally, the middleware function 214 provides the service of forwarding the measurement results on the UMTS RAT to the functional component 210 on the LTE platform 204.

As becomes apparent from the above examples, the middleware functions 214', 226 are to a certain extent complementary. This means that whereas the first middleware function provides to a functional component of the first platform a service of the second platform, the second middleware function provides to this functional component the possibility to subscribe for the event when the first platform wishes to trigger the service provided by the first middleware function, and vice versa.

Figure 5C:
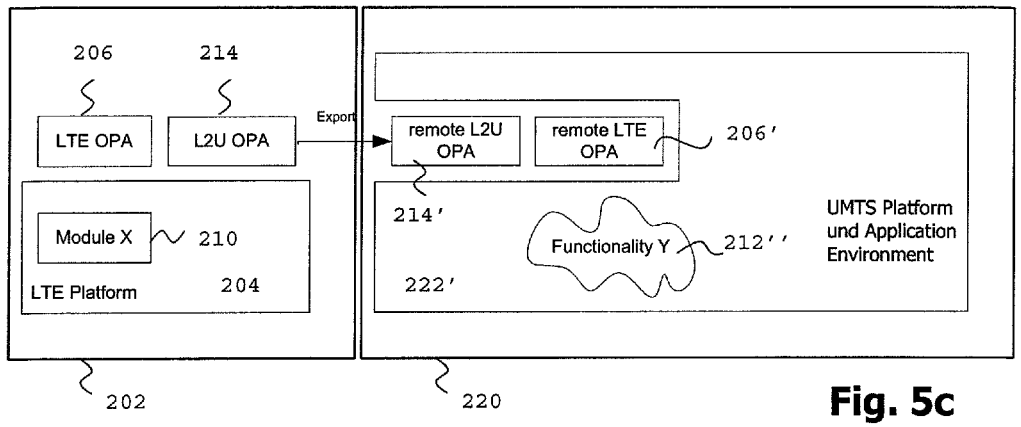

FIG. 5c shows another dual-platform scenario that has been derived from the scenario shown in FIG. 5b. In contrast to the scenario shown in FIG. 5b, it is assumed here that no specific details are known about the internal structure of a combined UMTS platform and application environment 222' of platform system 220. This may be the case because platform system 220 is not a proprietary system platform of the device manufacturer, but has been obtained from another vendor. However, the idea of exporting (including visualising) the middleware functions 206, 214 from the proprietary platform system 202 to the third party platform system 220 is still applicable to permit a functional component 212" (or any applications within the environment 222') to access the functional component 210 of platform system 202.

As regards the import of middleware functions, it has already been discussed above that one solution consists in the transfer of the program code of one or more middleware functions from platform system 202 to platform system 220. Another possibility will now be explained with reference to FIG. 6.

Figure 6:
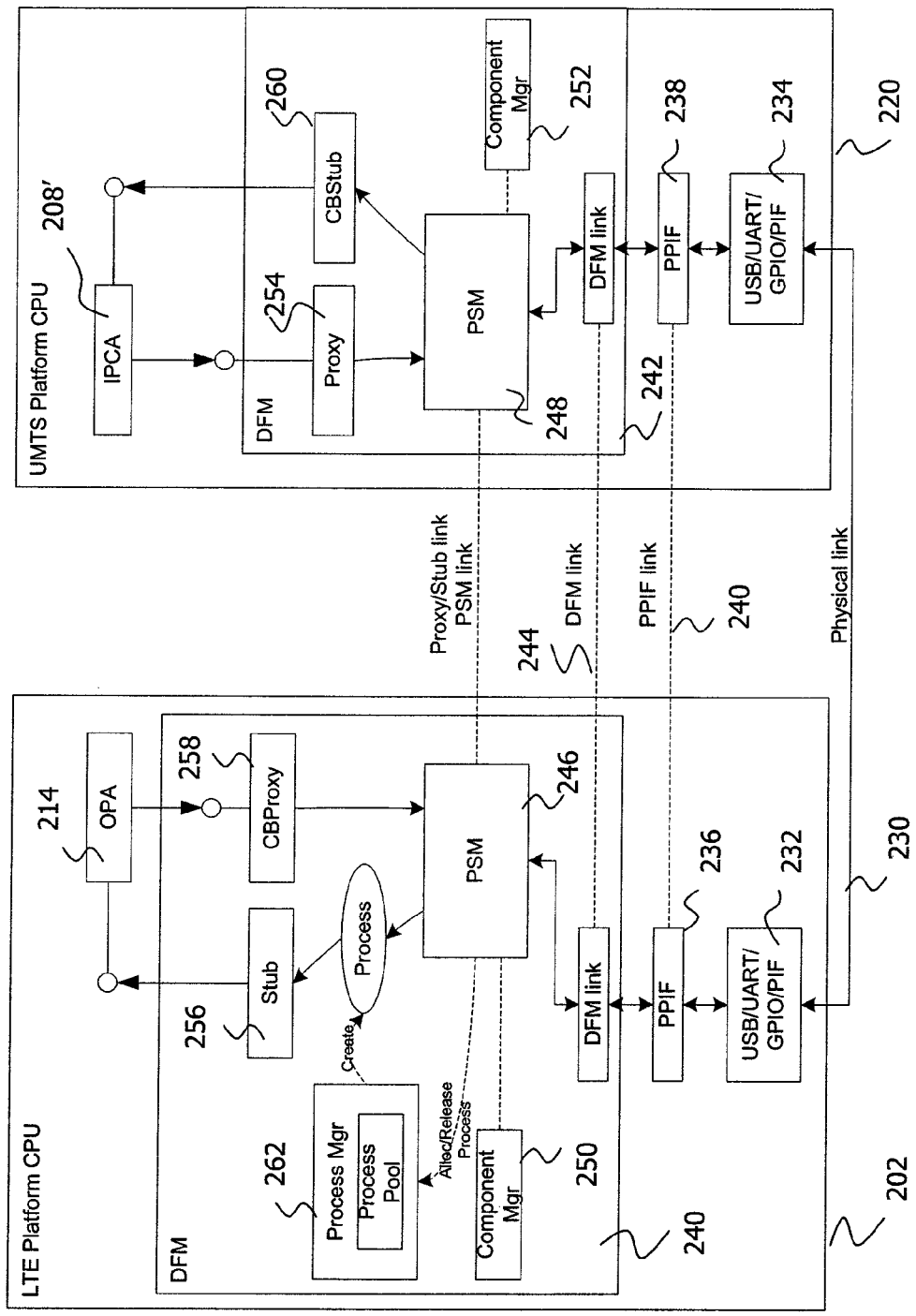
FIG. 6 shows a schematic diagram of an exemplary capsulation mechanism stretching across two platform system embodiments.

FIG. 6 schematically shows an approach for providing the inter-platform communication application 208' of FIGS. 5b and 5c with access to the middleware function 214' and to underlying functional components (i.e. for "importing" the middleware function 214). FIG. 6 illustrates the hardware configuration of platform systems 202 and 220 on a Central Processing Unit (CPU) level.

Basically, a mechanism called Distributed Function Model (DFM) is used to make the remote middleware function 214 of platform system 202 visible (simulating a "local" middleware function 214') to the other platform system 220. In other words, the DFM mechanism is used to logically interconnect the two CPUs of the LTE platform system 202 and the UMTS platform system 220 so that any functional components (not shown in FIG. 6) on the platform tier of platform system 220 are provided with access, via the inter-platform communication application 208' and the middleware function 214, to any functional components (not shown in FIG. 6) located on the platform tier of platform system 202. In this regard, the combination of the DFM mechanism and the middleware function 214 may be interpreted to constitute the "remote" middleware function 214' illustrated in FIGS. 5b and 5c. From another perspective, the DFM mechanism may be regarded as a means for "exporting" the middleware function 214 from platform system 202 to platform system 220. Basically, the DFM mechanism makes it possible for any functional component on the platform tier of platform system 220 to transparently access any functional component located on the platform tier of platform system 202 for which a corresponding middleware function (API or OPA) 214 has been defined.

As illustrated in FIG. 6, there exists a physical link 230 between the two platform systems 202, 220. The physical link 230 stretches between one or more physical interfaces 232 of platform system 202 and one or more physical interfaces 234 of platform system 220. The physical interfaces 232, 234 may be configured as data interfaces (for example according to the USB standard), as control interfaces (for example according to the UART or GPIO standard) or as Proprietary Interfaces (PIF). Data interfaces will typically support higher transfer rates than control interfaces at the cost of more sophisticated hardware requirements. Exemplary interface combinations will be described below with reference to FIGS. 8 to 10.

Still referring to FIG. 6, logical Platform CPU-to-Platform CPU interfaces (PPIF) 236, 238 are arranged above the physical interfaces 232, 234. The PPIFs 236, 238 are constituted by control software modules that communicate with logical and physical Hardware Access Layer (HAL) drivers to interconnect the two CPUs of the platform systems 202, 220. Based on the PPIF modules 236, 238, a logical PPIF link 240 can be established logically on top of the physical link 230. The configuration of the PPIF modules 236, 238 is illustrated in FIG. 7.

Figure 7:
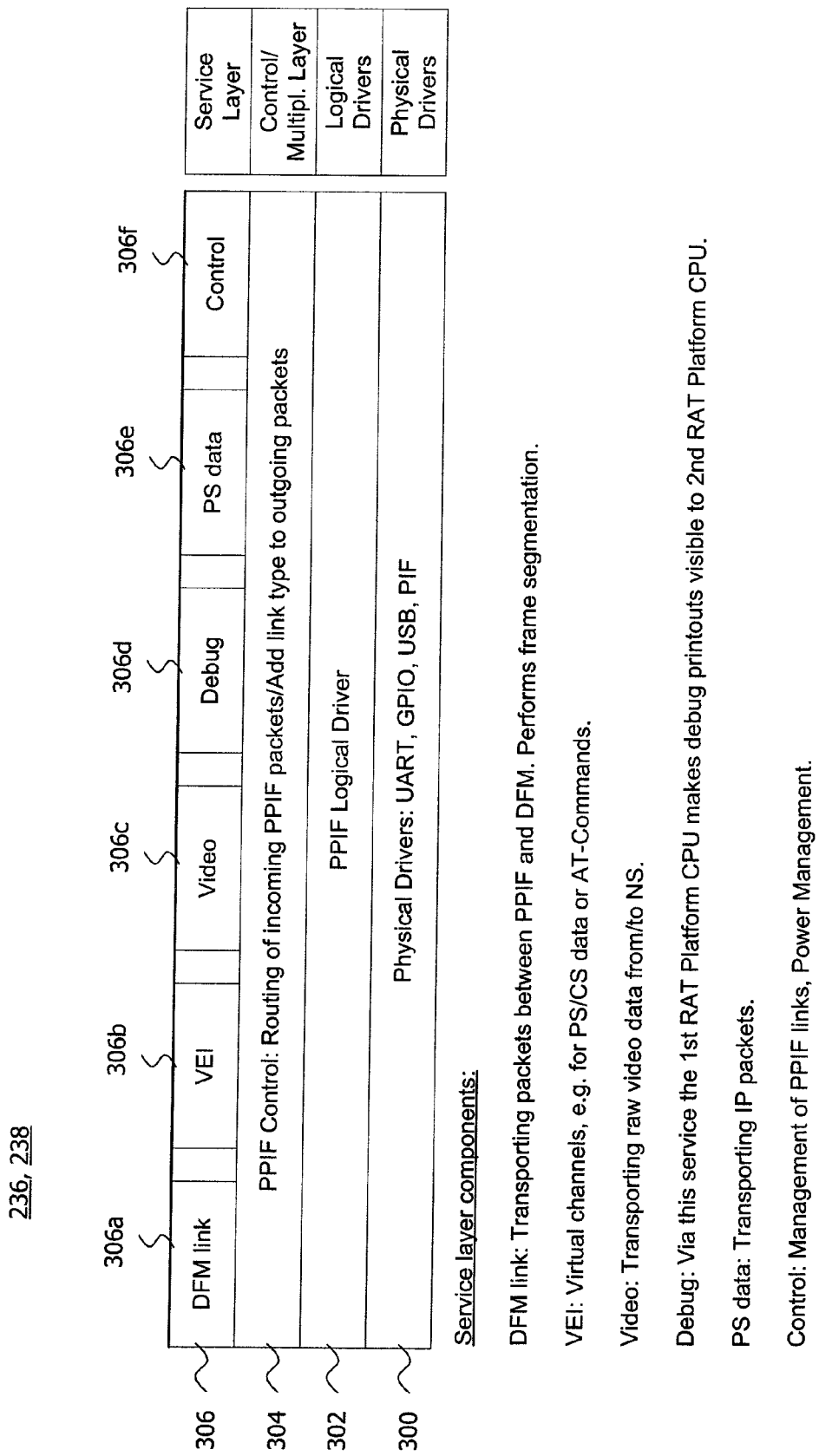
FIG. 7 is a schematic diagram of a logical inter-platform interface.

As shown in FIG. 7, each PPIF module 236, 238 includes a bottom layer 300 with physical interface drivers (HAL drivers) followed by a logical driver layer 302 and a PPIF data access layer comprising a control sub-layer 304 and a service sub-layer 306. The control sub-layer 304 handles opening and closing of services in the service sub-layer 306, routing of incoming and outgoing packets with respect to the individual services ("link types") in the service layer and associated multiplexing tasks. Additionally, the control sub-layer 304 is in charge of the sleep and wake-up logic for the individual services provided by the service sub-layer 306.

The service sub-layer 306 supports a plurality of different data flows. In the present context, the DFM link service 306a is of particular interest. Basically, the DFM link service 306a handles PDU transport between each of the PPIF modules 236, 238 and the associated DFM module 240, 242, respectively (see FIG. 6). The DFM link service 306a is in charge of creating and destroying DFM links towards the middleware function 214 and the inter-platform communication application 208', and of sending and receiving data on these DFM links.

A Virtual External Interface (VEI) service 306b of the service sub-layer 306 handles virtual communication (COM) ports for packet-switched (PS) and/or circuit-switched (CS) data. Moreover, the VEI service 306b supports the exchange of AT modem commands between the two platform systems 202, 220 of FIG. 6. Further services provided by the service sub-layer 306 include handling of raw CS data from the network and transfer of same to a video application (video service 306c), making visible of debug printouts to the remote system platform (debug service 306d), transport of Internet Protocol (IP) user data packets (PS data service 306e) as well as PPIF link management (including the decoding of PPIF commands) and power management (control service 306f).

Referring again to FIG. 6, the individual components of the DFM modules 240, 242 will now be described in more detail. As already mentioned above, the DFM modules 240, 242 rely on the PPIF modules 236, 238 for establishing one or more logical DFM links 244. Basically, the DFM module 242 of platform system 220 (under control of the inter-platform communication application 208') is responsible for creating any DFM link. Once the DFM link has been created, the DFM signalling between the two platform systems 202, 220 is symmetric. The DFM module 242 associated with the inter-platform communication application 208' will also be responsible for closing the DFM link.

The central component of each DFM module 240, 242 is a Proxy and Stub Manager (PSM) 246, 248. The PSM 246, 248 implements the functionality that makes it possible to visualize (or "export" and "import") interfaces of local functional components thus providing platform-based functions to a remote platform system. The PSM 246, 248 is in particular responsible for creating proxies and stubs for communicating functional components. There will be one proxy-stub pair (or "link") per middleware function (OPA interface) 214, and every proxy-stub pair is registered in the PSM 246, 248. The handling of proxies and stubs is symmetric within the PSM 246, 248. The PSM 246, 248 thus creates a proxy/stub link per OPA interface, and it is also in charge of creating and deleting instances of the OPA interfaces (upon delegation by the component managers 250, 252).

A proxy 254 is a component which receives interface requests from a local component (such as the inter-platform communication application 208') and redirects the interface requests to an associated remote stub 256. The stub 256 has an interface pointer referring to a specific functional component, so that it may use a function provided by that functional component through the corresponding OPA interface (middleware function) 214. When a functional component (or the associated inter-platform communication application 208') is calling a function (e.g. a method) of a remote functional component, it is actually calling the proxy 254, which calls the associated stub 256, which finally calls (via the middleware function 214) the function of the remote functional component. By using the DFM mechanism, this whole inter-platform process is performed transparently from the perspective of the functional components.

A further principle underlying the DFM mechanism is the so-called marshalling principle. Marshalling designates the process of packing an identifier of the calling functional component (or an identifier of the associated inter-platform communication application 208'), an identifier of the called function (or of the called functional component) as well as all input parameters of the called function into a buffer. This process will typically be carried out by the proxy 254 or by the inter-platform communication application 208'. The buffer is then handed over to the PSM 248, which puts it into a PDU according to a proprietary or an open protocol standard. The PDU is then sent over the DFM link 244 to the remote PSM 246. The remote PSM 246 unpacks the PDU and sends the buffer thus recovered to the stub 256. In the stub 256, the buffer is unmarshalled and the associated function is called. Marshalling and unmarshalling is done in the same way for the output parameters (return values) of the called function once they become available. In this regard, the callback proxy 258 will automatically trigger the callback stub 260 in a similar manner as described above with respect to the proxy 254 and the stub 256.

As shown in FIG. 6, each DFM module 240, 242 includes a component manager (CM) 250, 252. The CM 250, 252 is responsible for managing all functional components. To this end, each CM 250, 252 keeps a list of all local and remote functional components of the platform systems 202, 220 for which an instance has been created. For external or remote components, the CM 250, 252 returns a device identifier of the device (e.g., the platform system) where the remote component is located to the local PSM 246, 248 so that the PSM 246, 248 may create the corresponding component itself.

The DFM module 240 of platform system 202 further comprises a process manager 262. The process manager 262 creates and releases processes for handling an incoming request from the platform system 220 (i.e. from the remote CPU). Creating and releasing processes avoids blocking the DSM module 246.

The DFM mechanism of FIG. 6 may be symmetrically installed on two or more platform systems for a bi-directional visualisation of the interfaces provided by middleware functions. In such a scenario, all functional components of one side can access functional components of the other side as if they were located on a single platform chip.

Figure 8:
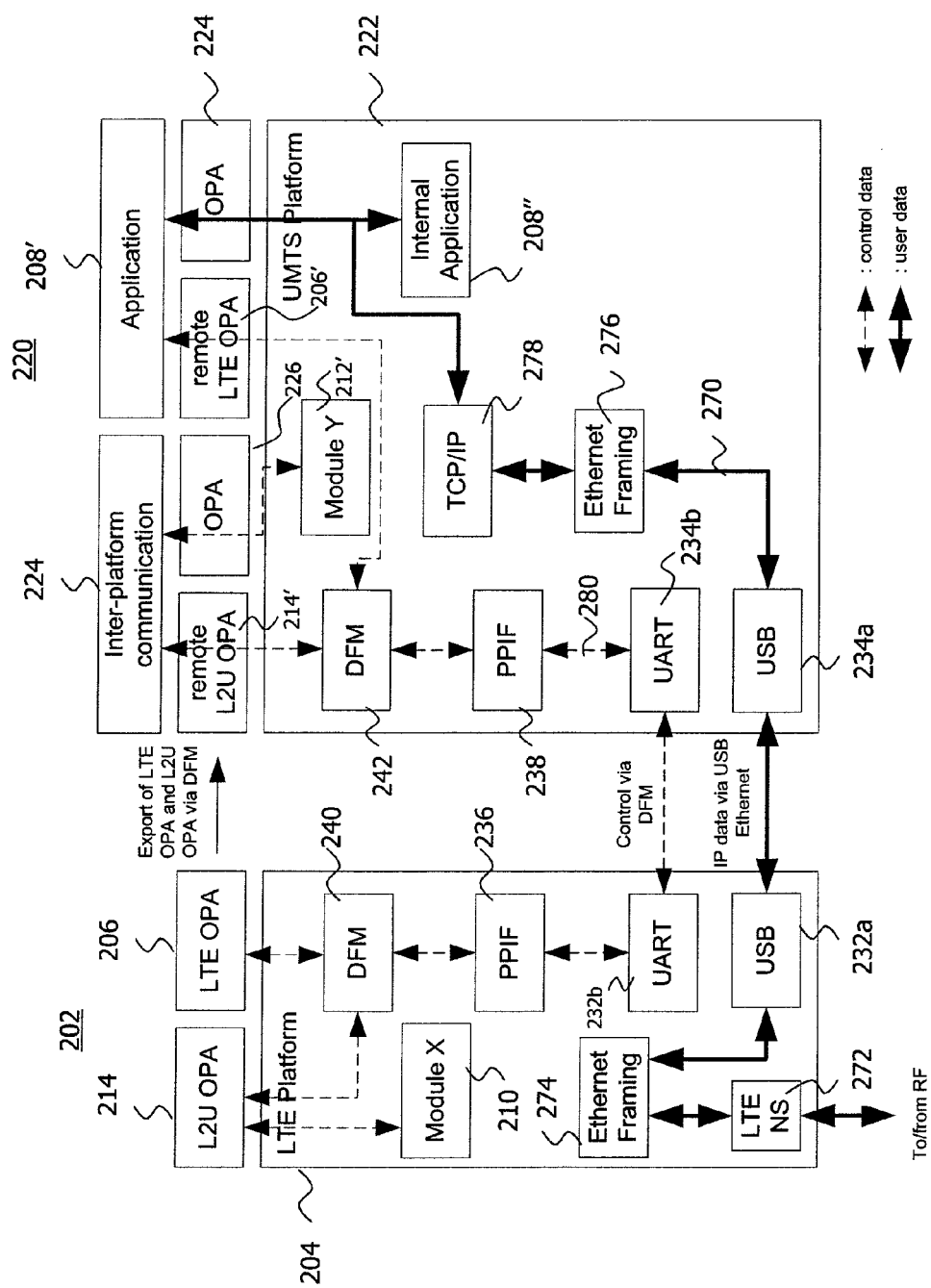
FIG. 8 shows a schematic diagram of two platform system embodiments coupled according to a first interface variant.

FIG. 8 now shows a schematic diagram of the individual physical interfaces over which the physical link 230 in FIG. 6 between the two platform systems 202 and 220 will be established. A description of those components of platform systems 202, 220 that have already been discussed above in context with FIGS. 5b, 5c and 6 will be omitted.

As shown in FIG. 8, the two platform systems 202, 220 are linked in parallel by USB interfaces 232a, 234a on the one hand and UART interfaces 232b, 234b on the other hand. The USB interfaces 232a, 234a constitute high-rate user data interfaces based on the USB Ethernet standard. A USB link (which is part of a data connection 270 indicated by arrows with full lines) established via the USB interfaces 232a, 234a provides network access according to the LTE standard to applications residing on the UMTS platform 222. Such applications may either be applications 208' installed on top of the UMTS platform or platform-internal applications 208". The data connection 270 stretches, on the side of the LTE platform 204, across a LTE Network Signalling (NS) module 272, an Ethernet framing module 274 as well as the USB interface 232a. On the side of the UMTS platform 222, the data connection 270 stretches across the USB interface 234a, an Ethernet framing module 276 as well as a TCP/IP module 278.

A control connection 280 indicated by arrows with broken lines stretches across the two UART interfaces 232b, 234b. A first branch of this control connection 280 stretches between functional component 210 of LTE platform 204 and functional component 212' of UMTS platform 222. Exemplary signalling scenarios utilising this branch of the control connection 280 will be discussed later on with reference to FIGS. 11 to 14.

A second branch of the control connection 280 stretches from application 208' of the UMTS platform 222 to middleware function 206 of the LTE platform 204 (which corresponds to the imported middleware function 206' illustrated on top of the UMTS platform 222). The middleware functions 206 and 206' have been defined for accessing the functional component 210 or any other functional components of the LTE platform 204. The main difference between the middleware functions 214 and 206 relates to the fact that the middleware function 206 (LTE OPA) comprises the services provided to an application in order to control the LTE platform 204, e.g. settings like radio on/off, network selection, etc. The middleware function 214 (L2U OPA) comprises additional services for inter-platform communication of the LTE platform like for system control, SIM access, IRAT handover mechanisms and optionally AT command exchange.

While the USB interfaces 232a, 234a support high data rates on the data connection 270, much lower data rates will typically occur on the control connection 280, and for this reason less complex UART interfaces 232b, 234b are utilised for inter-platform control signalling on the control connection 280.

Figure 9:
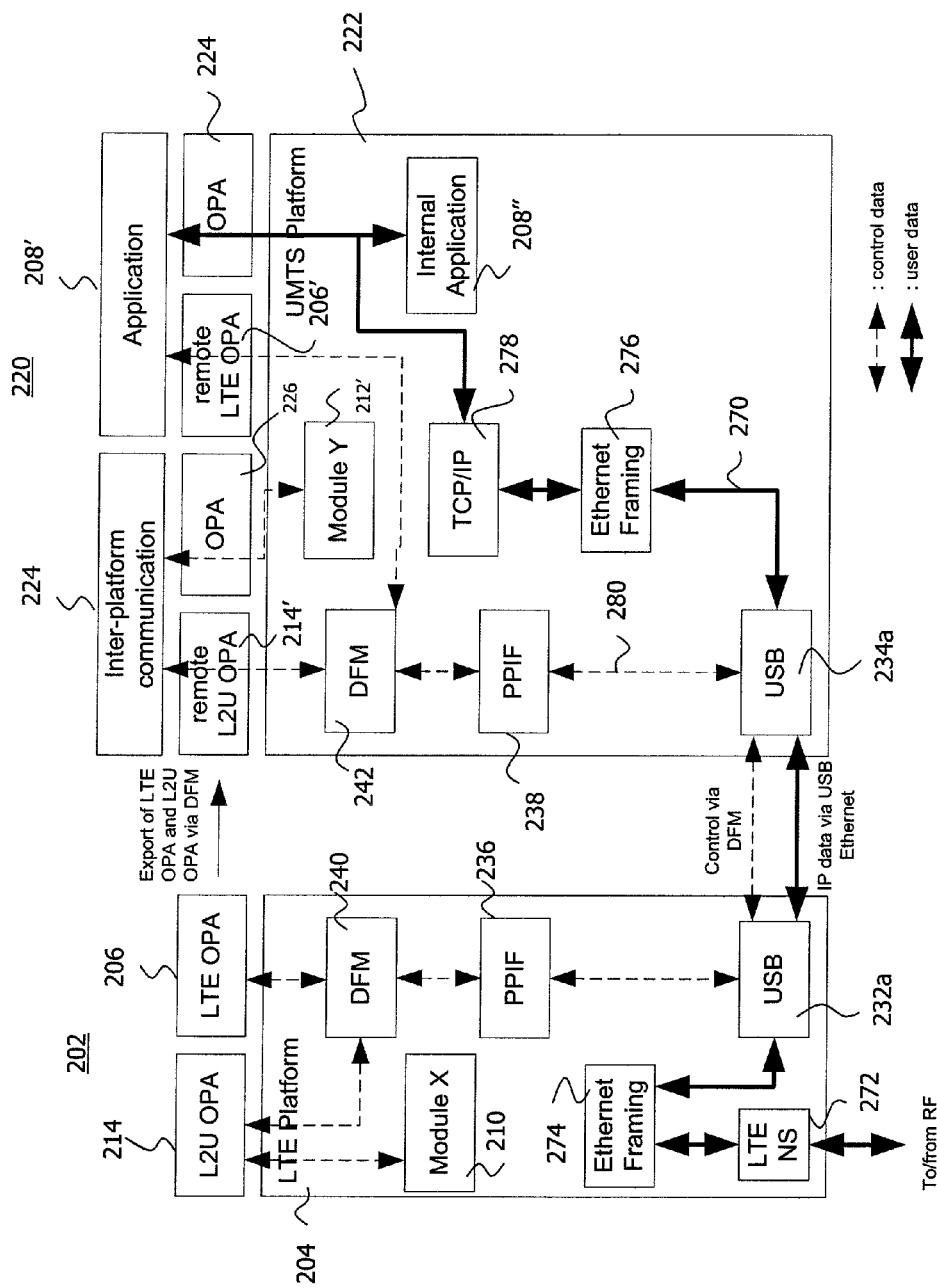
FIG. 9 shows a schematic diagram of two platform system embodiments coupled according to a second interface variant.

In the interface scenario shown in FIG. 9 the two UART interfaces 232b, 234b of FIG. 8 have been omitted. In this scenario, both the control connection and the data connection stretch over the two USB interfaces 232a, 234a.

Figure 10:
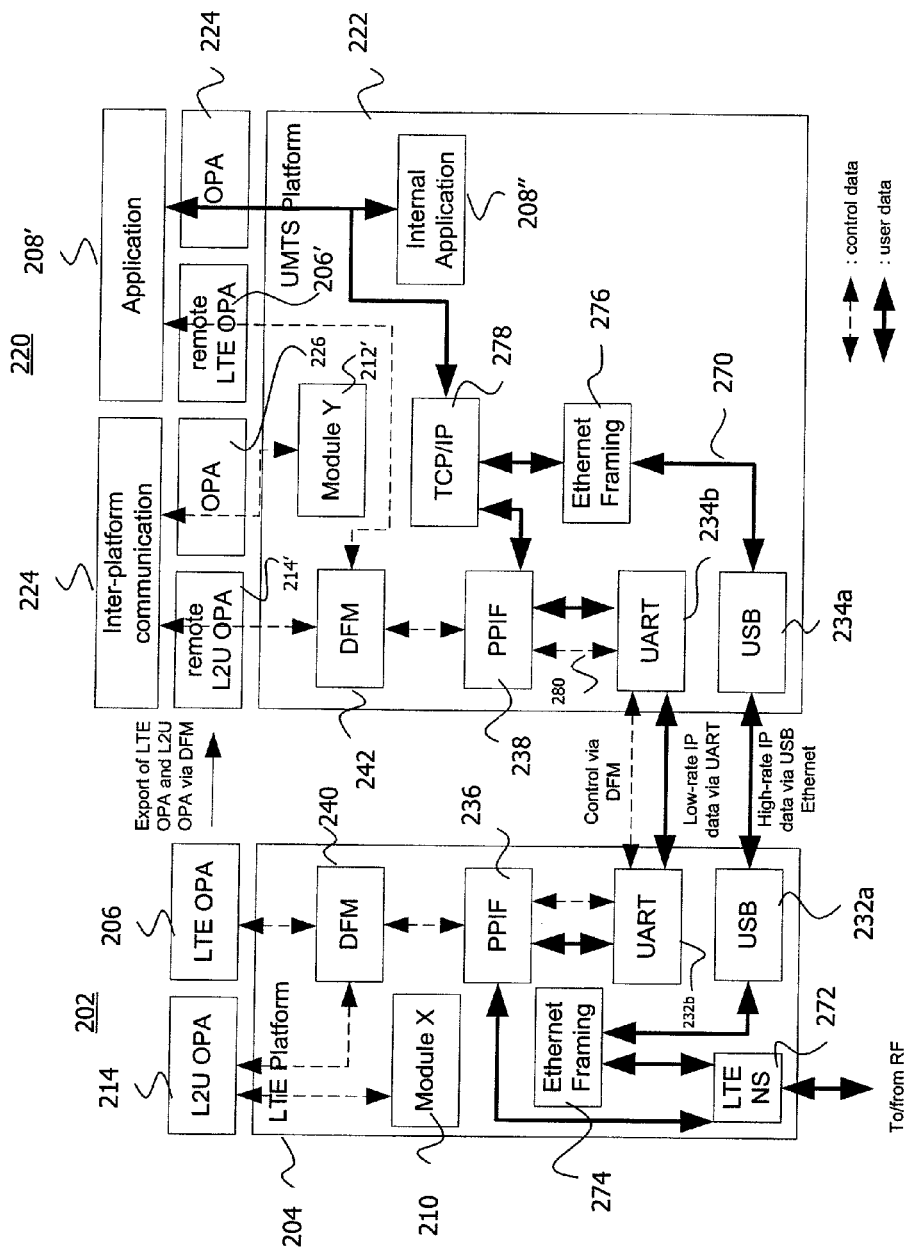
FIG. 10 shows a schematic diagram of two platform system embodiments coupled according to a third interface variant.

In a still further interface scenario shown in FIG. 10, the UART interfaces 232b, 234b are additionally used for transferring low-rate user data, while high-rate user data are transferred via the USB interfaces 232a, 234a.

In the interface scenarios shown in FIGS. 8 and 10, the transfer of IP data (including user and application data) is handled separately from the control signalling. For IP data, the USB Ethernet mechanism is used directly as transport vehicle between the LTE platform 204 and the UMTS platform 222. This approach has amongst others the advantage that the transport mechanism for IP data between the two platforms 204, 222 is the same that may also be used between one of the platforms 204, 222 and an external device such as a personal computer (PC) or laptop when one or both of the platforms 204, 222 reside, for example, on a network card coupled to the PC or laptop.

It should be noted that the inter-platform control signalling concerning the setup, the release, etc. of IP data transfer via the USB Ethernet service may of course be controlled via the UART-based control signalling. The control signalling may also be used to visualise and access functions of the middleware tier on remote platforms to allow for a communication between functional components on a platform level. As shown in FIG. 10, the control interfaces 232b, 234b may optionally be used for transferring low-rate IP data if necessary.

As regards the PPIF functionalities shown in FIGS. 8 to 10, the physical interfaces may be adapted to the PPIF driver layer in such a way that communication channels may use different connection types (e.g., different physical interfaces like USB or UART) transparently. The mapping of communication services to physical interfaces may be freely configurable. As shown in FIG. 9, a possible mapping of communication services to the USB and UART interfaces 232a, 234a, 232b, 234b could be selected such that high-rate IP data are transferred via the USB interfaces 232a, 234a, whereas low-rate IP data and control signalling is transferred via the UART interfaces 232b, 234b.

Now, several exemplary inter-platform signalling scenarios will be discussed with reference to FIGS. 11 to 14. In each case it is assumed that first functional component 210 located on LTE platform 204 accesses or calls (or gets accessed or called by) functional component 212' located on UMTS platform 222. In the context of these signalling embodiments, a virtual functional component ("Virtual Module Y") 212''' implemented on the LTE platform 204 will be introduced. Basically, the virtual functional component 212''' simulates to the functional component 210 the existence of the functional component 212' on the LTE platform 204. In this context, the virtual functional component 212' basically performs translation tasks and acts as a proxy in front of the functional component 210. If necessary, a similar virtual functional component ("Virtual Module X" not shown in the drawings) may be installed on the UMTS platform 222 as a proxy in front of the functional component 212'.

In each of the following signalling embodiments it will be assumed that middleware function 214' on the side of the UMTS platform 222 has been imported from the UMTS platform 222 using the DFM mechanism discussed above in context with FIG. 6. This means that the functional component 214' is only virtually existing on the side of the UMTS platform 222, while the actual program code underlying the functional component 214' resides in the form of functional component 214 on the side of the LTE platform 204. Of course, in an alternative scenario not shown in FIGS. 11 to 14, the corresponding program code may already natively be installed on the side of the UMTS platform 222 or may physically be transferred from the LTE platform 204 to the UMTS platform 222 either during device manufacture or thereafter.

Figure 11:
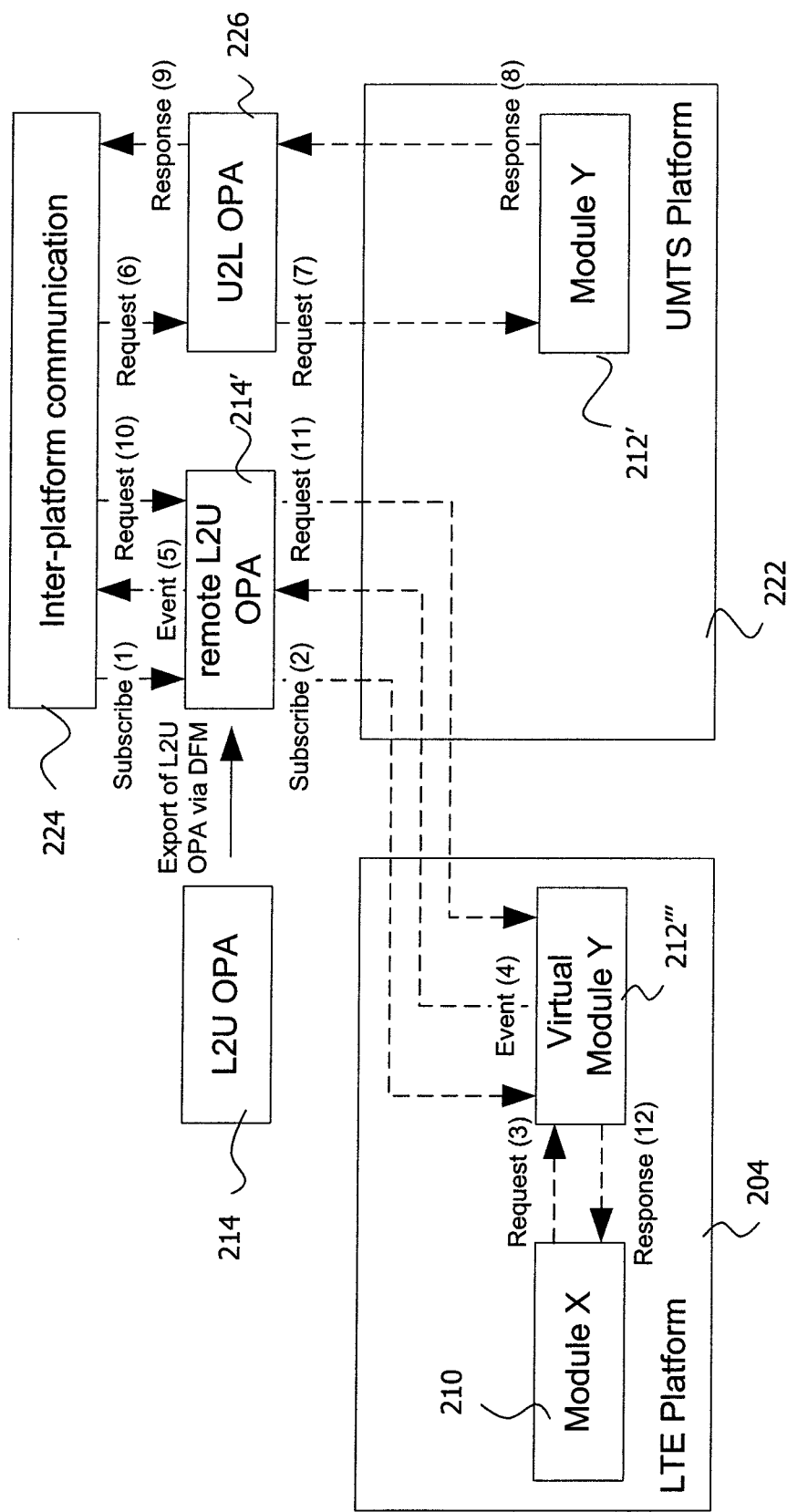
FIG. 11 shows a schematic diagram of a first signalling embodiment involving two functional components located on different platform system embodiments.

Referring now to FIG. 11, a signalling scenario including a request of ciphering parameters from a functional component in the form of a SIM module 212' on the UMTS platform 222 by a functional component in the form of a Network Signalling (NS) module 210' on the LTE platform 204 will be described first.

As a prerequisite of this first signalling scenario, inter-platform communication application 224 subscribes to related signalling events of the virtual functional component 212''' via the middleware function 214' as indicated by signalling steps (1) and (2). The corresponding subscription message sent from the inter-platform communication application 224 to the virtual functional component 212''' informs the virtual component 212''' that the inter-platform communication application 224 has to be notified if the NS module 210 requests any ciphering parameters.

Signalling step (3) indicates the transmission of such a request for ciphering parameters from NS module 210 to virtual functional component 212''' (as the NS module on the LTE platform 204 is assuming that the remote SIM module 212' is co-located with the NS module on the LTE platform 204). The inter-platform communication application 224 has previously subscribed to such signalling events from the NS module 210, and the virtual functional component 212''' thus converts (or translates) the request received from the NS module 210 into a predefined signalling event. This conversion step may include packing the request received in signalling step (3) into an event message having a format that can be read by the inter-platform communication application 224. In signalling steps (4) and (5), the event message including the converted request is transferred from the virtual functional component 212''' via the middleware function 214' to the inter-platform communication application 224.

After having received the event message from the virtual functional component 212''', the inter-platform communication application 224 reconverts (or re-translates) the event message into a request that can be read by the SIM module 212'. The corresponding request for ciphering parameters is then forwarded via a further middleware function 226 to the SIM module 212' residing on the UMTS platform 222 as indicated by signalling steps (6) and (7).

In a next step, SIM module 212' executes the received request and sends a response message together with the requested ciphering parameters via the middleware function 226 to the inter-platform communication application 224. This is indicated by signalling steps (8) and (9).

The inter-platform communication application 224 converts the received response message into a request message which can be interpreted by the virtual functional component 212'''. The request message is forwarded in signalling steps (10) and (11) via the middleware function 214' to the virtual functional component 212'''. In this regard, the middleware function 214' acts as an API in relation to the virtual functional component 212'''.

The virtual functional component 212''' reconverts the request message received from the inter-platform communication application 224 into a format expected by the NS module 210. The corresponding response message including the requested ciphering parameters is finally sent in signalling step (12) to the NS module 210.

Figure 12:
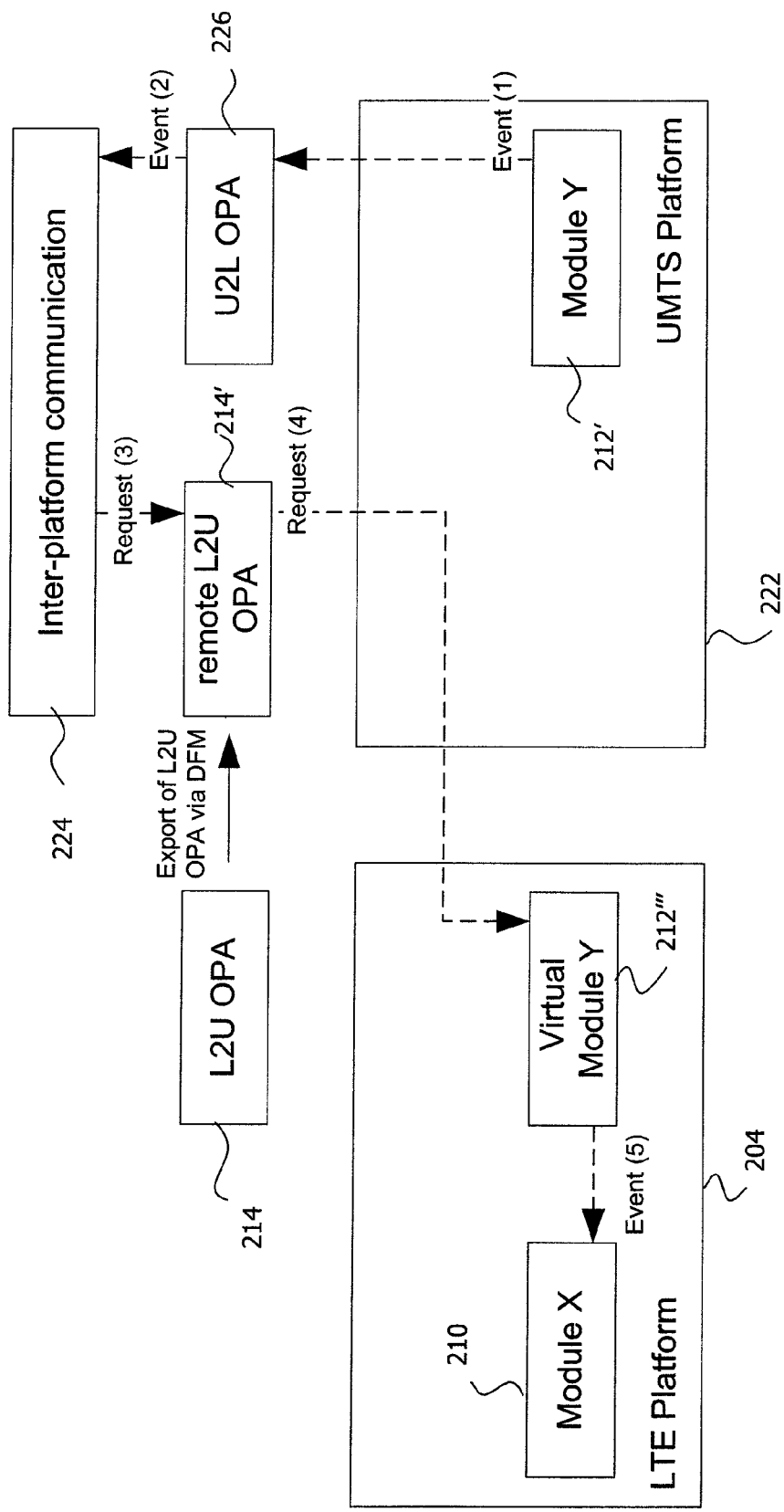
FIG. 12 shows a schematic diagram of a second signalling embodiment involving two functional components located on different platform system embodiments.

A further signalling embodiment relating to the transmission of a signalling event from functional component 212' located on the UMTS platform 222 to another functional component 210 located on the LTE platform 204 will now be described in context with FIG. 12. The corresponding platform-level event can be a change of the SIM state detected by a functional component in the form of a SIM module 212' on the UMTS platform 222. This change of the SIM state will need to be signalled to a functional component 210 on the LTE platform 204. The functional component 210 and/or the inter-platform communication application 224 may optionally have previously subscribed to such an event as discussed above in context with the signalling scenario of FIG. 11.

Once the SIM module 212' has detected a change of the SIM state, it generates a corresponding event message and forwards the same via the middleware function 226 to the inter-platform communication application 224 as indicated by signalling steps (1) and (2).

The inter-platform communication application 224 converts the received event message into a request message that can be read by the virtual functional component 212''' of the LTE platform 204. The corresponding request message is then forwarded in signalling steps (3) and (4) via the middleware function 214' to the virtual functional component 212'''.

The virtual functional component 212''' reconverts the request message into the event message (i.e., into a format that can be read by the functional component 210) and sends the resulting event message in signalling step (5) to the functional component 210.

Figure 13:
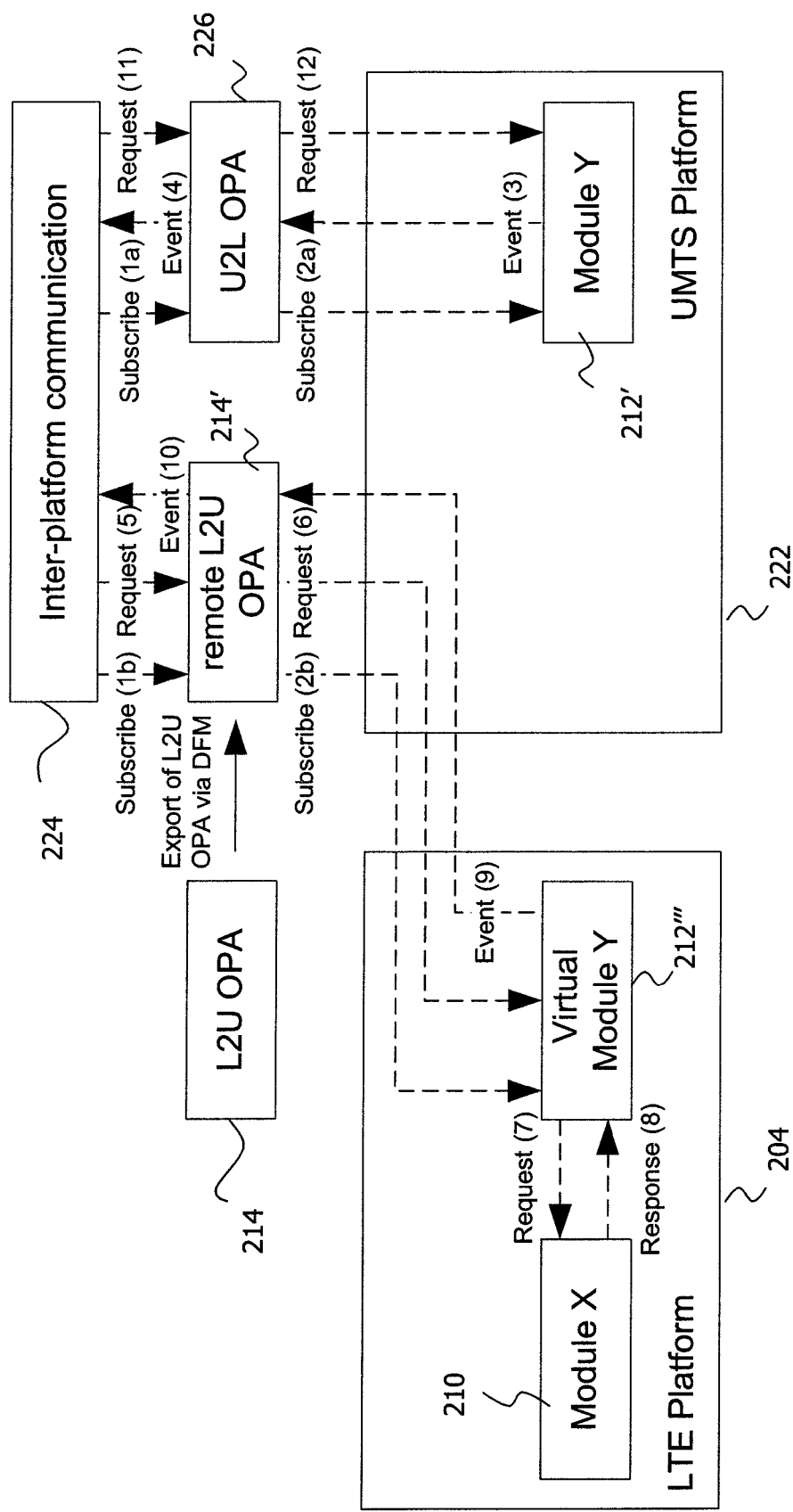
FIG. 13 shows a schematic diagram of a third signalling embodiment involving two functional components located on different platform system embodiments.

Another signalling scenario relating to a request message sent from functional component 212' (here an IP module) located within the UMTS platform 222 to functional component 210 located within the LTE platform 204 will now be described with reference to FIG. 13. Such a request message could for example be a Packet Data Protocol (PDP) context activation/deactivation request sent from a functional component in the form of an IP module 212' on the UMTS platform 222 to a functional component in the form of a NS module 210 on the LTE platform 204.

As a prerequisite, inter-platform communication application 224 will have subscribed to signalling events of the IP module 212' and of the virtual functional component 212'''. The corresponding subscription messages are transferred in signalling steps (1*a*) and (2*a*) as well as (1*b*) and (2*b*), respectively.

The event-based process starts when the IP module 212' detects a PDP context activation/deactivation event and notifies the inter-platform communication application 224 of this event. The corresponding notification is transferred via the middleware function 226 as indicated by signalling steps (3) and (4). The event will replace a corresponding request directly transferred to the NS module 210 in a stand-alone platform configuration in which both modules 210, 212' are co-located on one and the same platform.

The inter-platform communication application again converts the event to a request which can be interpreted by the virtual functional component 212'''. The resulting request message is forwarded to the virtual functional component 212''' via the middleware function 214' in signalling steps (5) and (6).

The virtual functional component 212''' forwards the received request message to the NS module 210. In this case the virtual functional component 212''' need not (necessarily) perform any conversion tasks. Upon receipt of the request message from the virtual functional component 212''', the NS module 210 generates a response message and transmits this response message in signalling step (8) to the virtual functional component 212'''. The virtual functional component 212''' then converts the received response message to an event message that can be interpreted by the inter-platform communication application 224 and sends the event message to the inter-platform communication application 224 via the middleware function 214' as indicated by signalling steps (9) and (10).

The inter-platform communication application 224 reconverts the event message received from the virtual functional component 212''' to a request message readable by the IP module 212' and forwards the request message thus generated, via the middleware function 226, to the IP module 212'. The corresponding signalling steps (11) and (12) are shown in FIG. 13. Receipt of the request message by the IP module 212' replaces the corresponding response message that would have been directly obtained from the NS module 210 if the NS module 210 was co-located with the IP module on the UMTS platform 222.

Figure 14:
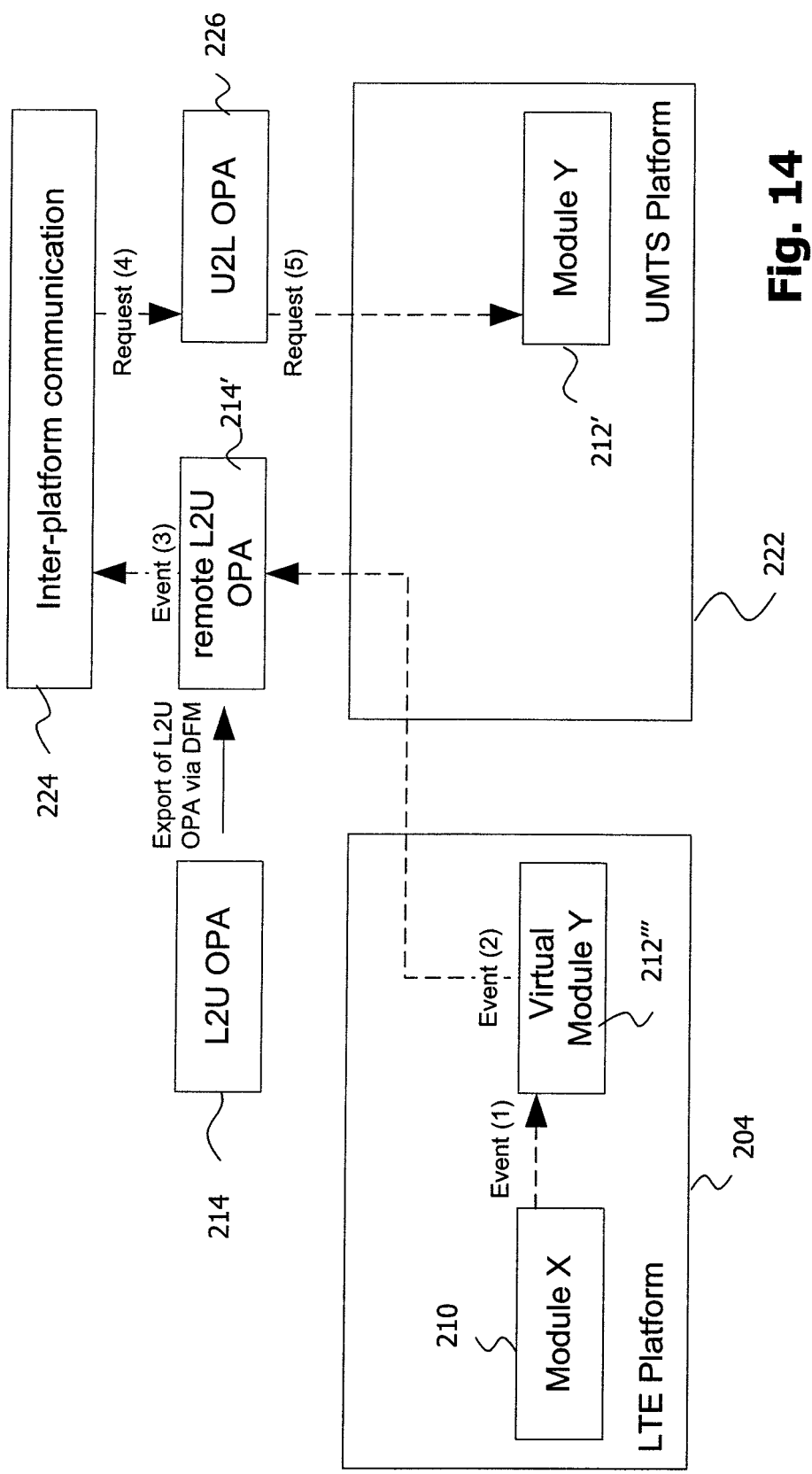
FIG. 14 shows a schematic diagram of a fourth signalling embodiment involving two functional components located on different platform system embodiments.

A final signalling example will now be described with reference to FIG. 14. This signalling example relates to the transmission of an event message from functional component 210 located on the LTE platform 204 to remote functional component 212' located on the UMTS platform 222. Such an event message could be indicative of a PDP context status change, which is typically signalled from a functional component in the form of an NS module 210 on the LTE platform 204 to a functional component in the form of an IP module 212' on the UMTS platform 222.

Referring to FIG. 11, the signalling starts with NS module 210 detecting a PDP context status change. Upon detection of such a status change, the NS module 210 generates a corresponding event message and transmits the event message in signalling step (1) to the virtual functional component 212'''. Virtual functional component 212''' forwards the received event message to inter-platform communication application 224 via the middleware function 214'. This process is indicated as signalling steps (2) and (3) in FIG. 11.

The inter-platform communication application 224 converts the event message into a request message that can be interpreted by the IP module 212'. The corresponding request message is then forwarded, via the middleware function 226, in signalling steps (4) and (5) to the IP module 212'. This request message replaces the corresponding event message that would be received by the IP module 212' if the NS module 210 was co-located with the IP module 212' on the UMTS platform 222.

It should be noted that the signalling scenarios discussed above can of course be extended and that other signalling scenarios can of course be conceived. For example, the signalling concepts discussed above in context with event messages and request messages exchanged between remotely located functional components could also be implemented to realise internal NAT or RAT handover signalling between two network access platforms such as the LTE and UMTS platforms illustrated in the drawings. Moreover, inter-platform control massages relating to, for example, system control, radio control or SIM lock control could be implemented as well. The signalling may thus in particular, but not exclusively, pertain to network access-related messages. Such messages may also include the exchange of modem commands, such as AT commands, between the two network access platforms.

Signalling from one network access platform to another may optionally be triggered by the callback functionality discussed above in context with the DFM mechanism shown in FIG. 6. In order, for example, to trigger the generation of the event of obtaining an L1 measurement from the RAT implemented on the LTE platform CPU 202 of FIG. 6, the UMTS platform CPU 220 first has to notify (via the corresponding middleware function) the LTE platform CPU 202 that an L1 measurement is requested from the LTE platform side. If the corresponding L1 measurement is finally received, the LTE platform CPU 202 triggers the UMTS platform CPU 220 by the corresponding callback function for a transfer of the measurement results to the UMTS platform CPU 202. In this regard a similar signalling flows as illustrated in FIGS. 13 and 14 can be implemented.

It may be envisaged in the above embodiments that one single standard platform system (such as the LTE platform system described above) is combined with one of a plurality of different other platform systems (such as one of several UMTS platform systems). In such a case it may occur that each of the other platform systems needs a specific adaptation to the middleware functions provided by the standard platform system, and in such a case plug-in modules provided on the application or middleware tier may be used to implement the necessary adaptations. The appropriate plug-in may also be transferred to a "remote" middleware function using, for example, the DFM mechanism illustrated in FIG. 6.

In cases in which a platform system that is to be combined with a standard platform system having an export functionality as regards the middleware function does not support any of the open interface standards such as USB or UART, such an open interface can be replaced by a proprietary interface accessing a shared Random Access Memory (RAM) located between the two platform systems.

As has become apparent from the above description of preferred embodiments, the inter-platform communication mechanism proposed herein facilitates the connection of separate platform systems with shared functional components. This approach enables the provision of inter-platform functions relating, for example, to SIM access, inter-platform NAT handover mechanisms, system control, and so on.

A single system platform may be configured for being selectively installed either in a stand-alone configuration (as single platform system in a device) or in a dual-mode configuration (together with one or more further platform systems in the device). In particular, highly similar interface mechanisms may be used for such different deployments of one network access platform.

The use of standardized and commonly used interface standards such as USB and UART to connect one network access platform to another network access platform facilitates the adaptation of a specific network access platform system to network access platform systems and application platforms of different manufacturers. The adaptation of a specific network access platform system to third a party platform system is further facilitated by encapsulating the inter-platform communication interfaces and protocols. Additionally, a remote control of individual network access platform systems is possible as any calling functional component does not necessarily need to be co-located with the called functional component on one and the same network access platform system or one and the same device. This approach also permits the introduction of "lean" platform systems that connect to other platform systems if specific functions not available locally need to be implemented.

It is believed that the advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method of enabling a communication between functional components located on different network access platforms, the method comprising the steps of:
   providing a first network access platform comprising a first functional component adapted to provide and/or request a platform-based function to and/or from a second functional component located on a second network access platform;
   installing on the first network access platform an interplatform communication application adapted to control signaling between the first functional component and the second functional component;
   enabling the inter-platform communication application to contact a first middleware function provided for accessing the second functional component; and
   establishing a communication path between the first functional component and the second functional component via the inter-platform communication application and the first middleware function.

2. The method of claim 1, wherein the first middleware function is accessible via the second network access platform, and wherein enabling the inter-platform communication application to contact the first middleware function comprises providing a first interface on the first network access platform and coupling the first interface to a second interface of the second network access platform.

3. The method of claim 2, wherein the first interface and the second interface are configured as control interfaces, and further comprising providing a first data interface on the first network access platform and coupling the first data interface to a second data interface of the second network access platform for data transfer.

4. The method of claim 1, further comprising importing the first middleware function from the second network access platform.

5. The method of claim 1, further comprising inserting into the communication path a capsulation mechanism adapted to encapsulate and decapsulate signaling transferred between the first network access platform and the second network access platform.

6. The method of claim 5, wherein the capsulation mechanism is inserted into the communication path logically between the inter-platform communication application and the first middleware function.

7. The method of claim 1, further comprising inserting a virtual functional component located on the second network access platform into the communication path, the virtual functional component simulating to the second functional component an existence of the first functional component on the second network access platform.

8. The method of claim 7, wherein the virtual functional component performs translation tasks with respect to signaling occurring on the communication path.

9. The method of claim 1, further comprising subscribing, by the inter-platform communication application, to signaling events of at least one of the first functional component, the second functional component and the virtual functional component.

10. The method of claim 1, wherein the inter-platform communication application performs translation tasks with respect to signaling occurring on the communication path.

11. The method of claim 1, further comprising transferring at least one of the following signaling via the established communication path: handover signaling between the first and the second network access platform, signaling involving an access to a smart or memory card such as a Subscriber Identity Module (SIM) card, system control signaling, and modem command signaling.

12. The method of claim 1, further comprising providing a second middleware function adapted to provide access to the first functional component.

13. The method of claim 12, wherein the second middleware function is arranged in the communication path logically between the inter-platform communication application and the first functional component.

14. The method of claim 12, wherein the second middleware function physically resides on the first network access platform.

15. The method of claim 1, wherein at least one of the first middleware function and the second middleware function comprises an application programming interface (API).

16. The method of claim 1, wherein at least one of the first functional component, the second functional component or a third functional component are further accessible to a local application of an open application environment.

17. The method of claim 1, wherein the first network access platform comprises a first baseband controller supporting at least one first radio access technology (RAT), and wherein the second network access platform comprises a second baseband controller supporting a second RAT different from the at least one first RAT.

18. The method of claim 1, wherein the first network access platform and the second network access platform are co-located within a single device.

19. A method of enabling a communication between functional components located on different network access platforms, the method comprising the steps of:
providing a first network access platform comprising a first functional component adapted to provide and/or request a platform-based function to and/or from a second functional component located on a second network access platform;
installing on the first network access platform a middleware function enabling an access to the first functional component; and
establishing a communication path between the first functional component and the second functional component via the middleware function and an inter-platform communication application.

20. A platform system adapted to enable a communication between functional components located on different network access platforms, the system comprising:
a first network access platform comprising a first functional component adapted to provide and/or request a platform-based function to and/or from a second functional component located on a second network access platform;
an inter-platform communication application installed on of the first network access platform and adapted to control signaling between the first functional component and the second functional component;
an interface adapted to enable the inter-platform communication application to contact a middleware function provided for accessing the second functional component; and
a controller adapted to establish a communication path between the first functional component and the second functional component via the inter-platform communication application and the middleware function.

21. The platform system of claim 20, or in the platform system is configured according to the Universal Mobile Telecommunications System (UMTS) Standard.

22. The platform system of claim 20, wherein the interface is configured as at least one of a Universal Serial Bus (USB) or Universal Asynchronous Receiver/Transmitter (UART) interface.

23. A platform system adapted to enable a communication between functional components located on different network access platforms, the system comprising:
a first network access platform comprising a first functional component adapted to provide and/or request a platform-based function to and/or from a second functional component located on a second network access platform;
a middleware function installed on the first network access platform and adapted to enable an access to the first functional component; and
a controller adapted to establish a communication path between the first functional component and the second functional component via the first middleware function and an interplatform communication application.

24. The platform system of claim 23, wherein the platform system is configured according to the Long Term Evolution (LTE) standard.

25. A dual-platform device comprising:
a first network access platform comprising a first functional component;
a second network access platform comprising a second functional component adapted to provide and/or request a platform-based function to and/or from the first functional component located on the first network access platform;
an inter-platform communication application adapted to control signaling between the first functional component and the second functional component;
at least one middleware function adapted to enable access to at least one of the first functional component and the second functional component; and
a controller adapted to establish a communication path between the first functional component and second functional and the middleware function.

26. The device of claim 25, wherein the device is configured as at least one of a network card, a portable terminal and a mobile telephone.

27. The device of claim 25, wherein the functional components are configured as modules for requesting or providing Layer 1 (L1) measurements, Subscriber Identity Module (SIM) access, handover signaling, system control signaling and/or modem command signaling.

* * * * *